US012049084B2

(12) United States Patent
Hayashi et al.

(10) Patent No.: US 12,049,084 B2
(45) Date of Patent: Jul. 30, 2024

(54) PRINTER, NON-TRANSITORY COMPUTER-READABLE MEDIUM STORING COMPUTER-READABLE INSTRUCTIONS, AND PRINT METHOD

(71) Applicant: BROTHER KOGYO KABUSHIKI KAISHA, Nagoya (JP)

(72) Inventors: Kakeru Hayashi, Nagoya (JP); Noriyuki Kawamata, Nagoya (JP); Yoshinori Kato, Nagoya (JP); Katsunori Nishida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 119 days.

(21) Appl. No.: 17/719,667

(22) Filed: Apr. 13, 2022

(65) Prior Publication Data

US 2022/0242129 A1 Aug. 4, 2022

Related U.S. Application Data

(63) Continuation of application No. PCT/JP2021/008674, filed on Mar. 5, 2021.

(51) Int. Cl.
*B41J 2/165* (2006.01)

(52) U.S. Cl.
CPC .................................. *B41J 2/16535* (2013.01)

(58) Field of Classification Search
CPC .... B41J 2/16535; B41J 2/16544; B41J 2/165; B41J 2/16505; B41J 2/16511
See application file for complete search history.

(56) References Cited

U.S. PATENT DOCUMENTS 6,151,044 A * 11/2000 Gaasch ................ B41J 2/16544 347/33
6,164,754 A * 12/2000 Ide ....................... B41J 2/16538 347/90
2006/0274110 A1 12/2006 Kang et al.
(Continued)

FOREIGN PATENT DOCUMENTS

JP H11334093 A 12/1999
JP 2000190512 A 7/2000
(Continued)

OTHER PUBLICATIONS

Written Opinion and English translation issued in corresponding PCT Application No. PCT/JP2021/08674, dated May 25, 2021 (5 pages).

(Continued)

*Primary Examiner* — Jason S Uhlenhake
(74) *Attorney, Agent, or Firm* — K&L Gates LLP

(57) ABSTRACT

A printer includes a carriage including a first head and a second head at least partially overlapping in a sub-scanning direction, a first wiper for wiping the first head, and a second wiper for wiping the second head. The printer moves the first wiper to a first contact position where the first wiper is configured to contact the first head, and moves the second wiper to a second non-contact position where the second wiper is not configured to contact the second head. After moving the first wiper and the second wiper, the printer relatively moves the carriage to cause the first head to pass the first wiper at the first contact position.

18 Claims, 22 Drawing Sheets

(56) References Cited

U.S. PATENT DOCUMENTS

| | | | | |
|---|---|---|---|---|
| 2007/0188545 | A1* | 8/2007 | Miyamoto | B41J 2/16585 347/33 |
| 2007/0285461 | A1 | 12/2007 | Okada et al. | |
| 2010/0079539 | A1 | 4/2010 | Inoue | |
| 2010/0231634 | A1* | 9/2010 | Yokota | B41J 2/16552 347/17 |
| 2011/0057990 | A1 | 3/2011 | Heo et al. | |
| 2018/0311961 | A1 | 11/2018 | Kiuchi et al. | |
| 2019/0030899 | A1 | 1/2019 | Okuno et al. | |

FOREIGN PATENT DOCUMENTS

| | | | |
|---|---|---|---|
| JP | 2005262561 | A | 9/2005 |
| JP | 2007331116 | A | 12/2007 |
| JP | 2009269313 | A | 11/2009 |
| JP | 2010082856 | A | 4/2010 |
| JP | 2013116639 | A | 6/2013 |
| JP | 2017064921 | A | 4/2017 |
| JP | 2018187824 | A | 11/2018 |
| JP | 2019025719 | A | 2/2019 |
| KR | 20110025504 | A | 3/2011 |

OTHER PUBLICATIONS

Office Action issued in related Japanese Patent Application No. 2022-507137, dated Dec. 20, 2022. (4 pages.).

Office Action issued in related Japanese Patent Application No. 2022-507138, dated Apr. 4, 2023. (2 pages.).

International Search Report for International Patent Application No. PCT/JP2021/008674, mailed May 25, 2021.

* cited by examiner

A-A

PRINTER, NON-TRANSITORY COMPUTER-READABLE MEDIUM STORING COMPUTER-READABLE INSTRUCTIONS, AND PRINT METHOD

CROSS-REFERENCE TO RELATED APPLICATIONS

This application is a continuation application of International Patent Application No. PCT/JP2021/008674 filed Mar. 5, 2021, which claims priority from Japanese Patent Application No. 2020-040495 filed Mar. 10, 2020. The contents of the foregoing application are hereby incorporated herein by reference.

BACKGROUND

The present disclosure relates to a printer, a non-transitory computer-readable medium storing computer-readable instructions, and a print method.

A known inkjet recording device is provided with a recording head and a blade wiper unit. The recording head includes a plurality of discharge units in which are arrayed discharge opening rows corresponding to each of colors of black, cyan, magenta, and yellow. The plurality of discharge units are aligned along a longitudinal direction of the recording head. Two of the adjacent discharge units form a first overlap region at which the two adjacent discharge units overlap with each other in a transverse direction (hereinafter referred to as an X direction) of the recording head. The blade wiper unit includes a plurality of blade wipers for wiping each of the plurality of discharge units of the recording head. Two of the adjacent blade wipers form a second overlap region at which the two adjacent blade wipers overlap with each other in the X direction, at a position corresponding to the first overlap region.

Ink that has attached to the discharge unit is wiped away by the blade wipers moving in the X direction in a state in which the position of the wiping unit is determined such that the wiping unit is at a height at which the blade wipers are able to come into contact with the recording head.

SUMMARY

At a time of a wiping operation, for a portion of the blade wiper that is in contact with the first overlap region of the plurality of discharge units, the number of times of contact with the discharge unit is greater than a number of times of contact for a portion of the blade wiper that is not in contact with the first overlap region. Furthermore, the portion that comes into contact with the first overlap region comes into contact with a corner of the discharge unit. As a result, the portion that comes into contact with the first overlap region is more easily worn than the portion that does not come into contact with the first overlap region. When the blade wiper is worn, there is a possibility that the ink attached to the discharge unit is not sufficiently wiped away.

Various exemplary embodiments of the general principles described herein provide a printer, a non-transitory computer-readable medium storing computer-readable instructions, and a print method capable of reducing the possibility that ink attached to a head is not sufficiently wiped away, by suppressing wear of a wiper in a wiping operation.

A printer according to a first aspect of the present disclosure includes: a carriage including a first head and a second head separated in a main scanning direction and at least partially overlapping in a sub-scanning direction; a first wipe mechanism including a first wiper, and a first power portion being configured to move the first wiper between a first contact position where the first wiper is configured to contact the first head, and a first non-contact position where the first wiper is not configured to contact the first head; a second wipe mechanism including a second wiper, and a second power portion being configured to move the second wiper between a second contact position where the second wiper is configured to contact the second head, and a second non-contact position where the second wiper is not configured to contact the second head; a movement mechanism configured to relatively move the carriage in the main scanning direction with respect to the first wiper and the second wiper; a processor configured to control the first power portion, the second power portion, and the movement mechanism; and a memory storing computer-readable instructions. When executed by the processor, the computer-readable instructions instruct the processor to perform the following processes: performing first control of controlling the first power portion and moving the first wiper to the first contact position, and controlling the second power portion and moving the second wiper to the second non-contact position; and, after moving the first wiper and the second wiper by the first control, performing second control of controlling the movement mechanism and relatively moving the carriage to cause the first head to pass the first wiper at the first contact position.

A non-transitory computer-readable medium storing computer-readable instructions according to a second aspect of the present disclosure is a non-transitory computer-readable medium storing computer-readable instructions for a printer that includes a carriage including a first head and a second head separated in a main scanning direction and partially overlapping in a sub-scanning direction, a first wipe mechanism including a first wiper, and a first power portion being configured to move the first wiper between a first contact position where the first wiper is configured to contact the first head, and a first non-contact position where the first wiper is not configured to contact the first head, a second wipe mechanism including a second wiper, and a second power portion being configured to move the second wiper between a second contact position where the second wiper is configured to contact the second head, and a second non-contact position where the second wiper is not configured to contact the second head, a movement mechanism configured to move the carriage relative to the first wiper and the second wiper in the main scanning direction, and a processor configured to control the first power portion, the second power portion, and the movement mechanism. The computer-readable instructions cause a computer of the printer to perform the following processes: performing first control of controlling the first power portion and moving the first wiper to the first contact position, and controlling the second power portion and moving the second wiper to the second non-contact position; and, after moving the first wiper and the second wiper by the first control, performing second control of controlling the movement mechanism and relatively moving the carriage to cause the first head to pass the first wiper at the first contact position.

A print method according to a third aspect of the present disclosure is a print method for a printer that includes a carriage including two heads discharging ink, which are a first head and a second head separated in a main scanning direction and partially overlapping in a sub-scanning direction, a first wipe mechanism including a first wiper, and a first power portion being configured to move the first wiper between a first contact position where the first wiper is configured to contact the first head, and a first non-contact position where the first wiper is not configured to contact the first head, a second wipe mechanism including a second wiper, and a second power portion being configured to move the second wiper between a second contact position where the second wiper is configured to contact the second head, and a second non-contact position where the second wiper is not configured to contact the second head, a movement mechanism configured to move the carriage relative to the first wiper and the second wiper in the main scanning direction, and a processor configured to control the first power portion, the second power portion, and the movement mechanism. The print method performs the following processes: performing first control of controlling the first power portion and moving the first wiper to the first contact position, and controlling the second power portion and moving the second wiper to the second non-contact position; and, after moving the first wiper and the second wiper by the first control, performing second control of controlling the movement mechanism and relatively moving the carriage to cause the first head to pass the first wiper at the first contact position.

According to the first to third aspects, it is possible to suppress the second wiper from coming into contact with the first head and the second wiper becoming worn. Thus, the printer can appropriately perform the wiping of ink attached to the heads.

BRIEF DESCRIPTION OF THE DRAWINGS

Embodiments will be described below in detail with reference to the accompanying drawings in which.

DETAILED DESCRIPTION

Figure 1:
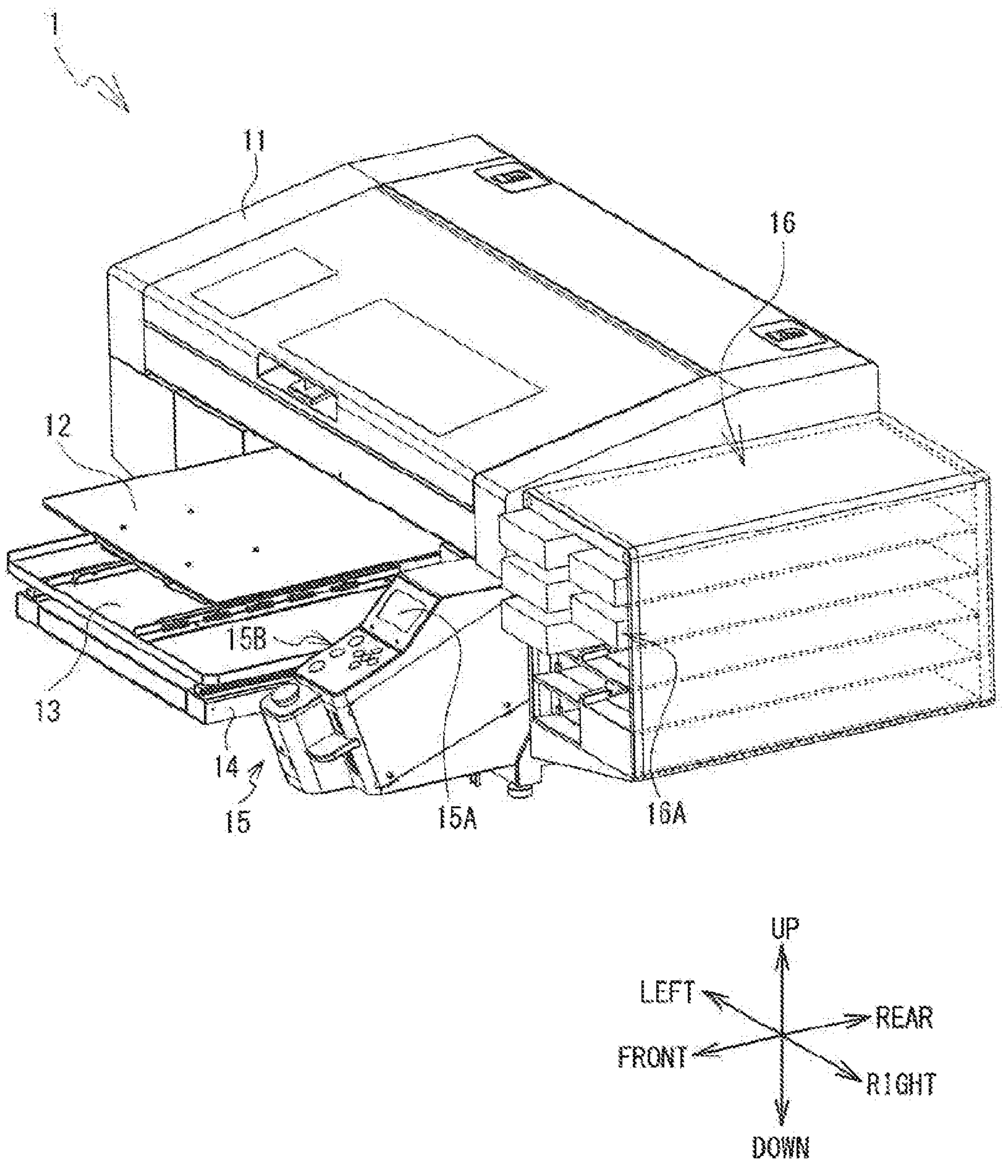
FIG. 1 is a perspective view of a printer.

A printer 1 according to an embodiment of the present disclosure will be described. The directions of up, down, lower left, upper right, lower right, and upper left in FIG. 1 correspond to an upper side, a lower side, front, rear, right, and left, respectively, of the printer 1. Note that mechanical elements of the present embodiment represented in the drawings indicate an actual scale.

Overview of Printer 1

The printer 1 is an inkjet printer that discharges a liquid and performs printing on a print medium, which is a cloth such as a T-shirt, paper, or the like. The printer 1 prints a color image on the print medium, for example, by discharging, downward, five different types of ink (white, black, yellow, cyan, and magenta), which are the liquid. In the following description, of the five types of ink, the white-colored ink is referred to as "white ink," and when no particular distinction is made between the four colors of black, cyan, yellow, and magenta ink, they are collectively referred to as "color inks."

As illustrated in FIG. 1, the printer 1 is provided with a housing 11, a platen 12, a tray 13, a platen drive mechanism 14, an operation portion 15, a mounting portion 16, and the like. The housing 11 is a cuboid shape and the front surface and the rear surface thereof respectively include openings. The operation portion 15 is provided at a position to the right and to the front of the housing 11. The operation portion 15 is provided with a display 15A and operation buttons 15B. The display 15A is a liquid crystal display (LCD) that can display various information. The operation buttons 15B are operated when a user inputs commands relating to various operations of the printer 1.

A sub-scanning drive portion 83C (refer to FIG. 10) that moves the platen 12 and the tray 13 using driving of a platen motor 831C (refer to FIG. 10) is built into the platen drive mechanism 14. The platen 12 is a plate shape that is rectangular in a plan view. The print medium is placed on the upper surface of the platen 12. The tray 13 that protects the print medium is rectangular in a plan view, and is provided below the platen 12. The mounting portion 16 is provided at the right of the housing 11. Cartridges 16A are connected to the mounting portion 16. A liquid stored in the cartridges 16A is supplied to heads.

Figure 2:
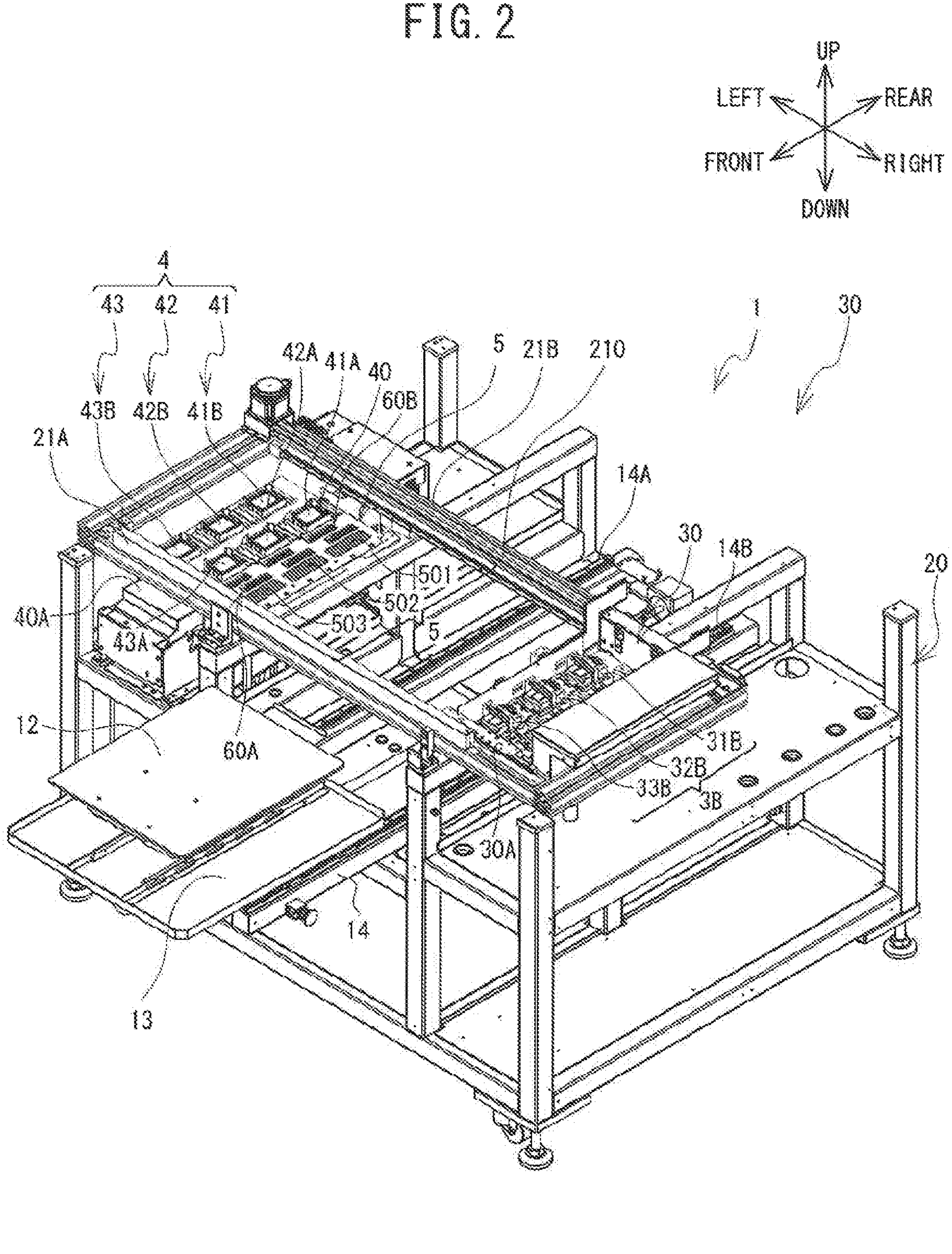
FIG. 2 is a perspective view illustrating an interior structure of the printer.

As illustrated in FIG. 2, a frame body 20, guide shafts 21A and 21B, a carriage 30, a cap mechanism 40, and cleaning assemblies 501, 502, and 503 (hereinafter referred to collectively as a cleaning assembly 5 when no distinction is made therebetween) are provided inside the housing 11 (refer to FIG. 1). The frame body 20 is a lattice-shaped structural body. The guide shafts 21A and 21B are supported on the upper ends of the frame body 20. The frame body 20 supports the platen drive mechanism 14 at the center of the frame body 20 in the left-right direction, and at a position lower than the guide shafts 21A and 21B in the up-down direction.

Figure 3:
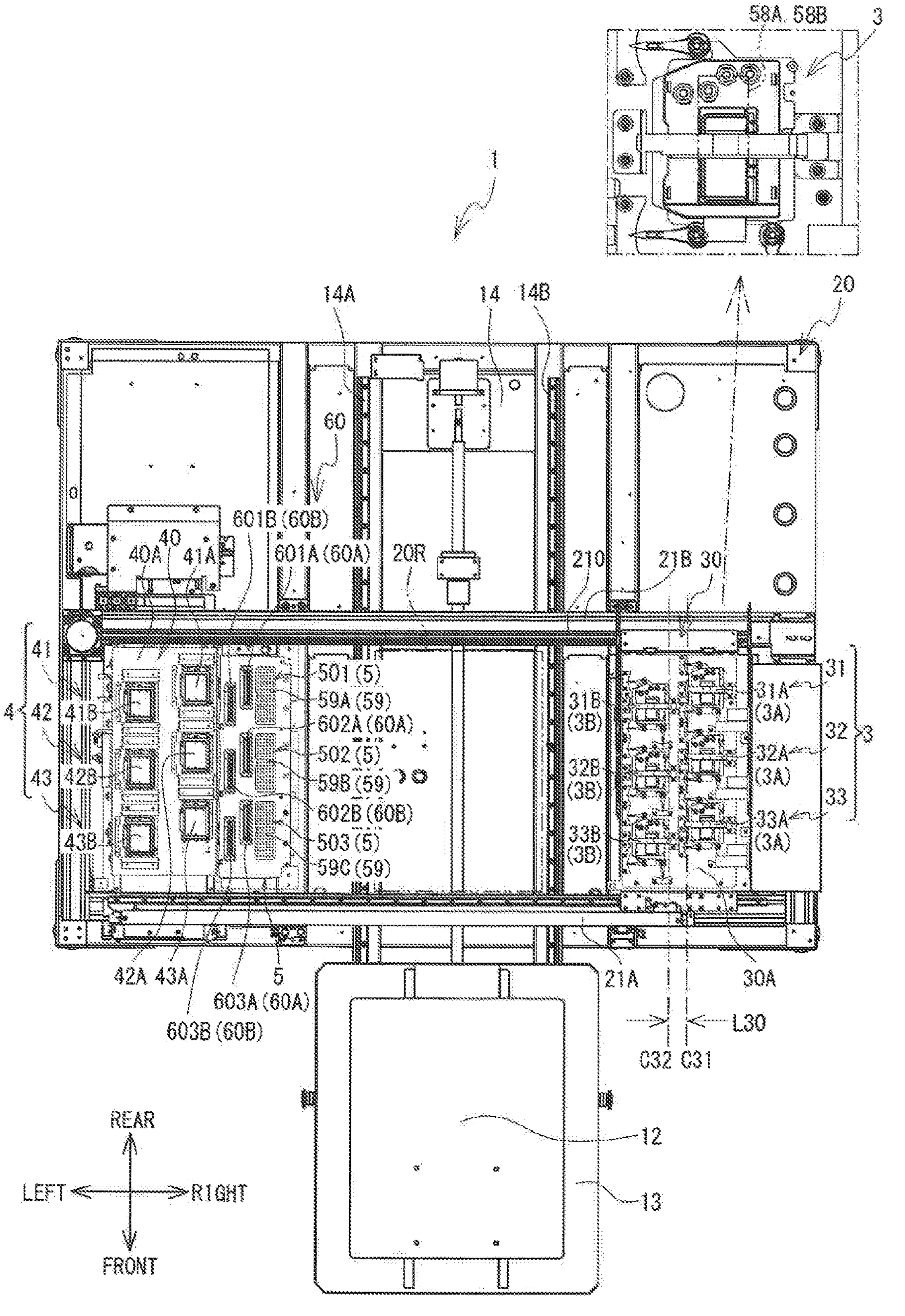
FIG. 3 is a plan view illustrating the internal structure of the printer.

The guide shafts 21A and 21B extend in the left-right direction. The guide shafts 21A and 21B are arranged in parallel to each other with an interval therebetween in the front-rear direction. The guide shafts 21A and 21B support the carriage 30 such that the carriage 30 is movable in the left-right direction (hereinafter also referred to as a main scanning direction). FIG. 2 and FIG. 3 illustrate a state in which the carriage 30 has moved to a right end. The carriage 30 includes heads 31, 32, and 33 (refer to FIG. 3, hereinafter collectively referred to as heads 3 or a head 3 when no distinction is made therebetween) that discharge the ink. The head 3 includes a piezoelectric element. However, the head 3 may include a heater, in place of the piezoelectric element, as a configuration that discharges the ink. A drive belt 210, which is provided along the guide shaft 21B, moves in the main scanning direction due to driving of a main scanning motor 813B (refer to FIG. 10) of a main scanning drive portion 83B (refer to FIG. 10). The carriage 30 is coupled to the drive belt 210, and is moved in the main scanning direction by the drive belt 210. A region sandwiched, from the front and rear directions, between the guide shafts 21A and 21B corresponds to a movement path of the carriage 30.

The platen drive mechanism 14 includes guide rails 14A and 14B at the upper surface thereof. The guide rails 14A and 14B extend in the front-rear direction. The guide rails 14A and 14B are arranged in parallel to each other with an interval therebetween in the left-right direction. The guide rails 14A and 14B support the platen 12 and the tray 13 such that the platen 12 and the tray 13 are movable in the front-rear direction (hereinafter also referred to as a sub-scanning direction). A region positioned between the guide rails 14A and 14B in the left-right direction corresponds to a movement path of the platen 12.

As illustrated in FIG. 3, the movement path of the platen 12, which moves along the guide rails 14A and 14B, intersects, in the front-rear direction, the movement path of the carriage 30, which moves along the guide shafts 21A and 21B, below a central portion, in the main scanning direction, of the movement path of the carriage 30. Hereinafter, a region in which the movement path of the platen 12 intersects the movement path of the carriage 30 in the up-down direction is referred to as a printing region 20R.

As illustrated in FIG. 2, the cap mechanism 40 and the cleaning assembly 5 are provided lower than the movement path of the carriage 30 in the up-down direction, and further to the left than the movement path of the platen 12 in the main scanning direction. The cap mechanism 40 and the cleaning assembly 5 are aligned in the main scanning direction, and the cap mechanism 40 is disposed to the left of the cleaning assembly 5, for example.

The cap mechanism 40 includes caps 41, 42, and 43 (hereinafter, when no distinction is made between the caps 41 to 43, they are referred to as caps 4). The cleaning assembly 5 includes a cleaning fluid vessel 5A and a flushing box 5B (refer to FIG. 4).

In the printer 1, the carriage 30 reciprocates in the main scanning direction while the platen 12 conveys the print medium in the sub-scanning direction. At this time, the printing is performed on the print medium by discharging the ink from the heads 3 onto the print medium placed on the platen 12 in the printing region 20R.

Carriage 30

As illustrated in FIG. 2 and FIG. 3, the carriage 30 includes a support portion 30A that supports the heads 3. The front end of the support portion 30A is supported by the guide shaft 21A so as to be movable in the main scanning direction. The rear end of the support portion 30A is supported by the guide shaft 21B so as to be movable in the main scanning direction. The drive belt 210 is connected to the rear end of the support portion 30A.

As illustrated in FIG. 3, the heads 31 include a first head 31A and a second head 31B having the same structure as each other. A discharge portion 58A is provided on the bottom surface of the first head 31A (refer to FIG. 14). A discharge portion 58B is provided on the bottom surface of the second head 31B (refer to FIG. 14). The discharge portions 58A and 58B are formed by a plurality of nozzles that discharge the ink being arrayed in the horizontal direction. The white ink is discharged from the discharge portion 58A. The color ink is discharged from the discharge portion 58B. The respective positions of the discharge portions 58A and 58B are aligned in the up-down direction. The first head 31A and the second head 31B are arranged with an interval therebetween in the main scanning direction. The first head 31A is disposed to the right of the second head 31B. A part of the front side of the discharge portion 58A of the first head 31A overlaps, in the sub-scanning direction, with a part of the rear side of the discharge portion 58B of the second head 31B. In other words, in the sub-scanning direction, the front end of the discharge portion 58A of the first head 31A is positioned between the front end and the rear end of the discharge portion 58B of the second head 31B. In the sub-scanning direction, the rear end of the discharge portion 58B of the second head 31B is positioned between the front end and the rear end of the discharge portion 58A of the first head 31A.

The heads 32 include a first head 32A and a second head 32B. The first head 32A is positioned to the front of the first head 31A. The second head 32B is positioned to the front of the second head 31B.

The head 33 includes a first head 33A and a second head 33B. The first head 33A is positioned to the front of the first head 32A. The second head 33B is positioned to the front of the second head 32B. The first heads 31A to 33A and the second heads 31B to 33B have the same structure as each other. The positional relationship of the second head 32B with respect to the first head 32A and the positional relationship of the second head 33B with respect to the first head 33A are the same as the positional relationship of the second head 31B with respect to the first head 31A. Hereinafter, when no distinction is made between the first heads 31A, 32A, and 33A, they are collectively referred to as first heads 3A or the first head 3A. When no distinction is made between the second heads 31B, 32B, and 33B, they are collectively referred to as second heads 3B or the second head 3B.

Figure 14:
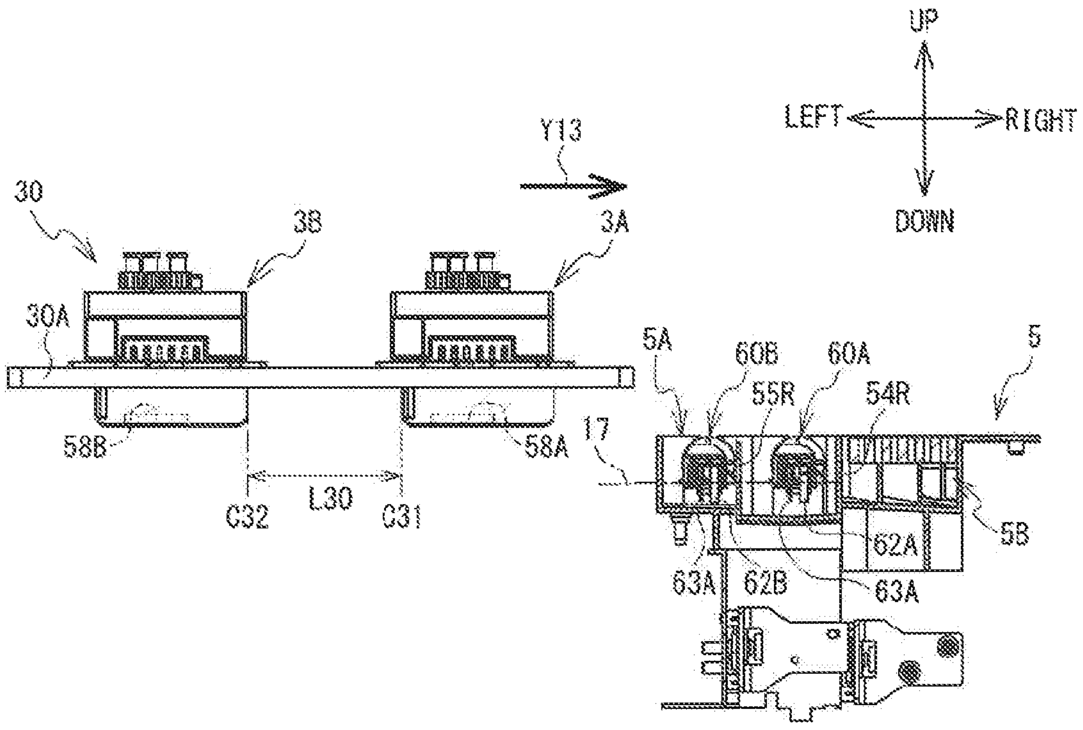
FIG. 14 is a diagram illustrating a positional relationship between the cleaning assembly and a carriage when the carriage is at a reference position.

As illustrated in FIG. 3 and FIG. 14, a position C31 of the left end of the first head 3A and a position C32 of the right end of the second head 3B are separated by an interval L30 in the main scanning direction. Hereinafter, the interval L30 is defined as an interval in the main scanning direction between the first head 3A and the second head 3B.

Cap Mechanism 40

As illustrated in FIG. 2 and FIG. 3, the cap mechanism 40 includes a support portion 40A that supports the caps 4. The support portion 40A can be moved up and down by a cap drive portion 83D (refer to FIG. 10). The caps 41 include a first cap 41A and a second cap 41B. The caps 42 include a first cap 42A and a second cap 42B. The caps 43 include a first cap 43A and a second cap 43B.

In a state in which the carriage 30 has moved to the left end of the movement path, the first cap 41A is positioned below the first head 31A. The second cap 41B is positioned below the second head 31B. The first cap 42A is positioned below the first head 32A. The second cap 42B is positioned below the second head 32B. The first cap 43A is positioned below the first head 33A. The second cap 43B is positioned below the second head 33B. Hereinafter, the position of the carriage 30 that has moved to the left end of the movement path is referred to as a reference position.

As a result of the support portion 40A moving upward in the state in which the carriage 30 is at the reference position, each of the first caps 41A to 43A is closely adhered to and covers the discharge portions 58A of the respective first heads 31A to 33A. Each of the second caps 41B to 43B is closely adhered to and covers the discharge portions 58B of the respective second heads 31B to 33B. During a period in which the printing is not performed on the print medium in the printer 1, the caps 4 suppress the ink from drying out, by covering the discharge portions 58A and 58B of the heads 3.

Cleaning Assembly 5

As illustrated in FIG. 3, the cleaning assembly 5 is positioned between the cap mechanism 40 and the platen 12 in the main scanning direction. The cleaning assembly 5 includes the cleaning assemblies 501, 502, and 503, and the cleaning assemblies 501, 502, and 503 are respectively positioned to the right of the caps 41 to 43, for example. The cleaning assemblies 501, 502, and 503 are aligned in the front-rear direction. The cleaning assembly 502 is positioned to the front of the cleaning assembly 501. The cleaning assembly 503 is positioned to the front of the cleaning assembly 502. The cleaning assemblies 501 to 503 have the same structure as each other. In FIG. 3, the cleaning assembly 501 includes a first wiper 601A, a second wiper 601B, and a perforated metal 59A. The cleaning assembly 502 includes a first wiper 602A, a second wiper 602B, and a perforated metal 59B. The cleaning assembly 503 includes a first wiper 603A, a second wiper 603B, and a perforated metal 59C. The first wipers 601A to 603A, the second wipers 601B to 603B, and each of the perforated metals 59A to 59C are respectively exposed upward.

The first wiper 601A wipes the discharge portion 58A of the first head 31A. The second wiper 601B wipes the discharge portion 58B of the second head 31B. At a time of a flushing operation, the perforated metal 59A allows the ink discharged from the first head 31A and the second head 31B to pass downward. The first wiper 602A wipes the discharge portion 58A of the first head 32A. The second wiper 602B wipes the discharge portion 58B of the second head 32B. At the time of the flushing operation, the perforated metal 59B allows the ink discharged from the first head 32A and the second head 32B to pass downward. The first wiper 603A wipes the discharge portion 58A of the first head 33A. The second wiper 603B wipes the discharge portion 58B of the second head 33B. At the time of the flushing operation, the perforated metal 59C allows the ink discharged from the first head 33A and the second head 33B to pass downward.

Hereinafter, when no distinction is made between the first wipers 601A, 602A, and 603A, they are collectively referred to as a first wiper 60A. When no distinction is made between the second wipers 601B, 602B, and 603B, they are collectively referred to as a second wiper 60B. When no distinction is made between the first wipers 60A and the second wipers 60B, they are collectively referred to as wipers 60. When no distinction is made between the perforated metals 59A, 59B, and 59C, they are collectively referred to as perforated metals 59.

Figure 4:
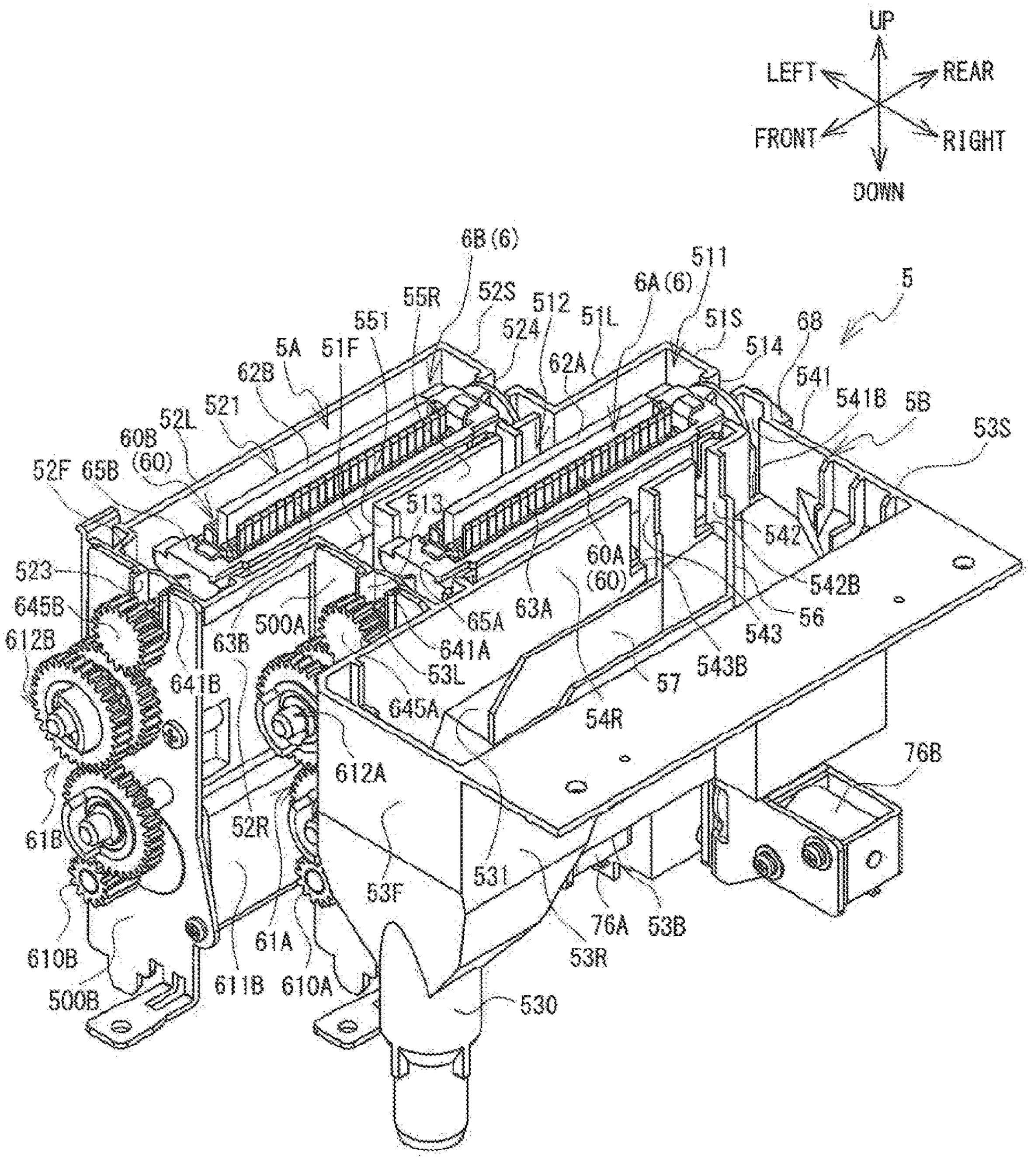
FIG. 4 is a perspective view of a cleaning assembly.
Figure 5:
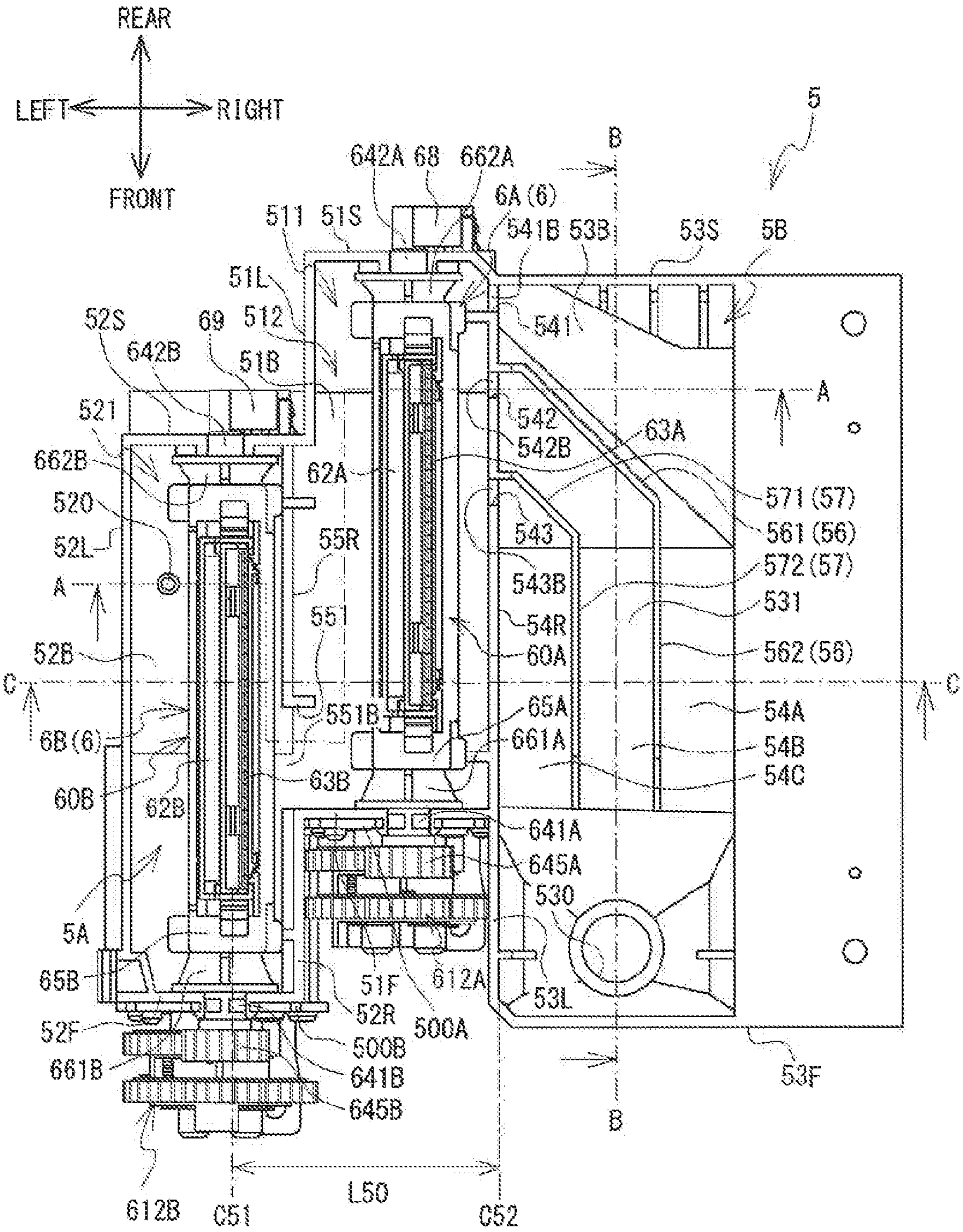
FIG. 5 is a plan view of the cleaning assembly.

As illustrated in FIG. 4 and FIG. 5, the cleaning assembly 5 includes the cleaning fluid vessel 5A, the flushing box 5B, a first wipe mechanism 6A, and a second wipe mechanism 6B. Hereinafter, when no distinction is made between the first wipe mechanism 6A and the second wipe mechanism 6B, they are collectively referred to as a wipe mechanism 6. The cleaning fluid vessel 5A and the flushing box 5B are containers that can store the cleaning fluid. In FIG. 4 and FIG. 5, the perforated metals 59 illustrated in FIG. 3 are omitted.

Cleaning Fluid Vessel 5A

Figure 6:
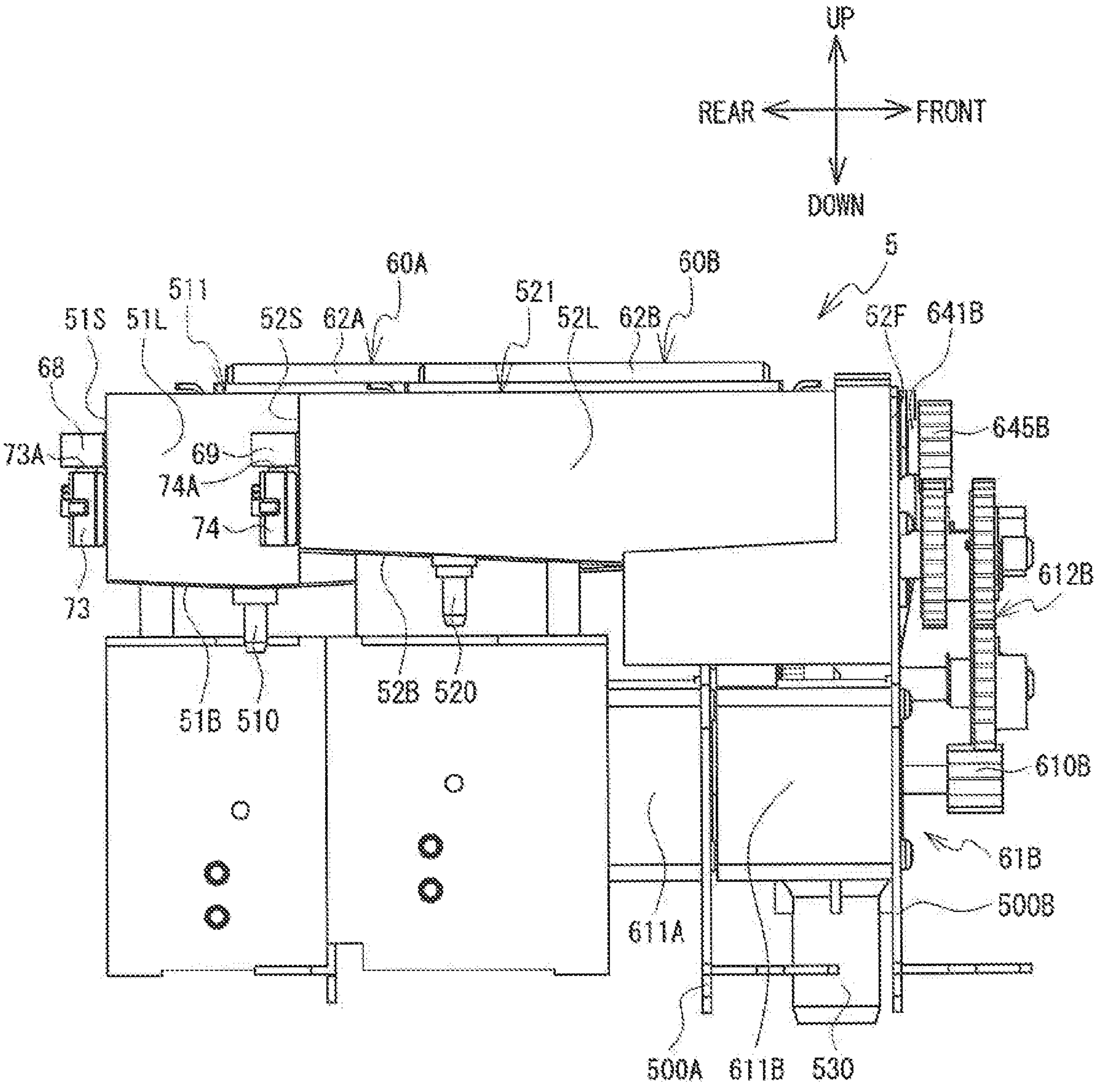
FIG. 6 is a left side view of the cleaning assembly.

The cleaning fluid vessel 5A includes first peripheral walls 51L, 51F, 51S, 52L, 52F, 52S, and 52R, a first side wall 54R, first bottom walls 51B and 52B (refer to FIG. 5), an inflow port 520, and a discharge port 510 (refer to FIG. 6). The first peripheral walls 51L, 51F, 51S, 52L, 52F, 52S, and 52R, the first side wall 54R, and the first bottom walls 51B and 52B define a storage space 512 of the cleaning fluid. The cleaning fluid flows from the inflow port 520 into the storage space 512. The cleaning fluid stored in the storage space 512 is discharged from the discharge port 510.

The first peripheral wall 52L is provided at the left end of the cleaning fluid vessel 5A and is orthogonal to the left-right direction. The first peripheral wall 52F extends to the right from the front end of the first peripheral wall 52L, and is orthogonal to the front-rear direction. The first peripheral wall 52R extends to the rear from the right end of the first peripheral wall 52F, and is orthogonal to the left-right direction. The first peripheral wall 51F extends to the right from the rear end of the first peripheral wall 52R, and is orthogonal to the front-rear direction. The right end of the first peripheral wall 51F is connected to the rear end of a second peripheral wall 53L of the flushing box 5B to be described later. The first peripheral wall 52S extends to the right from the rear end of the first peripheral wall 52L, and is orthogonal to the front-rear direction. The first peripheral wall 51L extends to the rear from the right end of the first peripheral wall 52S, and is orthogonal to the left-right direction. The first peripheral wall 51S extends to the right from the rear end of the first peripheral wall 51L, and is orthogonal to the front-rear direction. The right end of the first peripheral wall 51S is connected to the left end of a second peripheral wall 53S of the flushing box 5B to be described later. The positions of the upper ends of each of the first peripheral walls 51L, 51F, 51S, 52L, 52F, 52S, and 52R are aligned in the up-down direction.

As illustrated in FIG. 4, a first support portion 513 is provided at the first peripheral wall 51F. The first support portion 513 is a recessed portion that is recessed downward from the upper end of the first peripheral wall 51F. A first support portion 514 is provided at the first peripheral wall 51S. The first support portion 514 is a recessed portion that is recessed downward from the upper end of the first peripheral wall 51S. The first support portions 513 and 514 rotatably support the first wiper 60A. A second support portion 523 is provided at the first peripheral wall 52F. The second support portion 523 is a recessed portion that is recessed downward from the upper end of the first peripheral wall 52F. A second support portion 524 is provided at the first peripheral wall 52S. The second support portion 524 is a recessed portion that is recessed downward from the upper end of the first peripheral wall 52S. The second support portions 523 and 524 rotatably support the second wiper 60B.

As illustrated in FIG. 5 and FIG. 6, the first bottom wall 52B is connected to the lower ends of the first peripheral walls 52L, 52F, and 52S. The inflow port 520 is provided at the rear end of the first bottom wall 52B. An inflow hose that is not illustrated is connected to the inflow port 520. The cleaning fluid that has flowed into the cleaning fluid vessel 5A via the inflow port 520 from the inflow hose is stored and held in the storage space 512. As illustrated in FIG. 6, an inclination is formed at the first wall portion 52B that becomes lower, in the front-rear direction, toward a second communicating portion 551.

The first bottom wall 51B is connected to the lower ends of the first peripheral walls 51L, 51F (refer to FIG. 4), and 51S. The discharge port 510 is provided at the rear end of the first bottom wall 51B. A discharge hose that is not illustrated is connected to the discharge port 510. The cleaning fluid that is stored in the storage space 512 of the cleaning fluid vessel 5A flows into the discharge hose via the discharge port 510, and is discharged to the outside. An inclination is formed at the first wall portion 51B that becomes lower toward a portion at which the discharge port 510 is provided.

Figure 7:
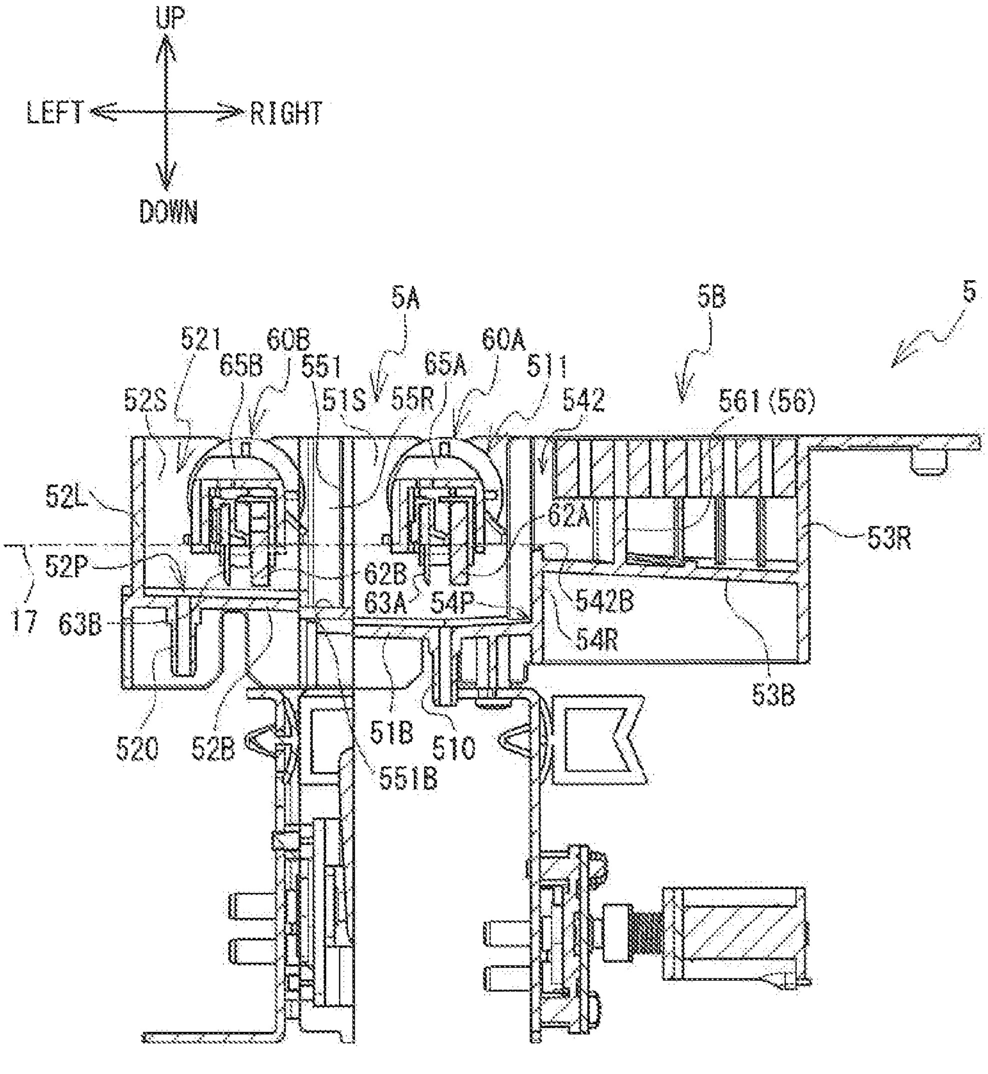
FIG. 7 is a cross-sectional view as seen in the direction of arrows along a line A-A illustrated in FIG. 5, when a first wiper and a second wiper are in non-contact positions.

As illustrated in FIG. 6, respective positions of the first bottom walls 51B and 52B are different in the up-down direction. A step is formed between the first bottom walls 51B and 52B. As illustrated in FIG. 6 and FIG. 7, a portion of the first bottom wall 51B at which the discharge port 510 is provided is positioned lower, in the up-down direction, than a portion of the first bottom wall 52B at which the inflow port 520 is provided.

As illustrated in FIG. 4, a support wall 500A is fixed to a front surface of the first peripheral wall 51F. The support wall 500A extends further downward than the lower end of the first peripheral wall 51F. The support wall 500A supports a first power portion 61A to be described later. A support wall 500B is fixed to the first peripheral wall 52F. The support wall 500B extends further downward then the lower end of the first peripheral wall 52F. The support wall 500B supports a second power portion 61B to be described later.

As illustrated in FIG. 4, FIG. 5, and FIG. 7, the first side wall 54R extends upward from the right end of the first peripheral wall 51B, and is orthogonal to the left-right direction. As illustrated in FIG. 4, the first side wall 54R is connected to the right end of the first peripheral wall 51F and the right end of the first peripheral wall 51S. In the main scanning direction, the first side wall 54R is provided between the cleaning fluid vessel 5A and the flushing box 5B to be described later, and partitions the cleaning fluid vessel 5A and the flushing box 5B.

As illustrated in FIG. 4 and FIG. 5, the first side wall 54R includes first communicating portions 541, 542, and 543. The first communicating portions 541, 542, and 543 are arrayed in that order from the rear toward the front, and each of the first communicating portions 541, 542, and 543 is a portion that is cut out, downward, from the upper end of the first side wall 54R. The first communicating portions 541, 542, and 543 may be cut out downward to a height of the first bottom wall 51B, for example. The first communicating portions 541 to 543 are provided further to the rear than a central position, in the front-rear direction, of the first side wall 54R. A portion that is the lower end of the first communicating portion 541 and that corresponds to a bottom portion of the cut out shape is referred to as a first bottom portion 541B.

As illustrated in FIG. 7, positions of the first communicating portion 542 and the discharge port 510 of the cleaning fluid vessel 5A are aligned in the front-rear direction.

A portion that is the lower end of the first communicating portion 542 and that corresponds to a bottom portion of the cut out shape is referred to as a first bottom portion 542B. A portion that is the lower end of the first communicating portion 543 and that corresponds to a bottom portion of the cut out shape is referred to as a first bottom portion 543B. Positions of the first bottom portions 541B to 543B are the same in the up-down direction, and are disposed at positions lower than the upper ends of the first peripheral walls 51L, 51F, 51S, 52L, 52F, 52S, and 52R.

As illustrated in FIG. 7, a position 54P is disposed at a position lower than a position 52P. The position 54P is a position, of the first bottom wall 51B, below the first bottom portion 542B of the first communicating portion 542. The position 52P is a position at which the inflow port 520 is provided, of the first bottom wall 52B. When two virtual lines extending downward from both ends, in the front-rear direction, of the first bottom portion 542B of the first communicating portion 542 are defined, the position 54P is, for example, a position between two points at which the two virtual lines intersect the first bottom portion 51B. Although not illustrated, each of the first bottom portion 541B of the first communicating portion 541 and the first bottom portion 543B of the first communicating portion 543 also includes a position that is the same as the position 54P, and both these positions are also disposed at positions lower than the position 52P.

A virtual plane that extends horizontally at the height of the first bottom portions 541B, 542B, and 543B is referred to as a reference fluid surface 17.

As illustrated in FIG. 4 and FIG. 5, the second side wall 55R extends upward from the left end of the first bottom wall 51B, and connects to the right end of the first bottom wall 52B at a partway position. The second side wall 55R is orthogonal to the left-right direction. The rear end of the second side wall 55R is connected to the first peripheral wall 52S. The second side wall 55R includes the second communicating portion 551. The second communicating portion 551 is a portion that is cut out downward from the upper end of the second side wall 55R. As illustrated in FIG. 5, a portion that is the lower end of the second communicating portion 551 and that corresponds to a bottom portion of the cut out shape is referred to as a second bottom portion 551B. As illustrated in FIG. 7, the second bottom portion 551B is positioned lower than the portion, of the first bottom wall 52B, at which the inflow port 520 is provided, and is positioned higher than the portion, of the first bottom wall 51B, at which the discharge port 510 is provided. The second communicating portion 551 may be cut out downward to a height of the second bottom portion 551B, for example. It is preferable that the second communicating portion 551 be provided at a position close to the first peripheral wall 51F, in the front-rear direction. Further, the second bottom portion 551B is disposed at a position lower than the reference fluid surface 17 that corresponds to the height of the first bottom portions 541B, 542B, and 543B of the first communicating portions 541 to 543.

As illustrated in FIG. 5, the second side wall 55R divides, in the left-right direction, the storage space 512 surrounded by the first peripheral walls 51L, 51F, 51S, 52L, 52F, 52S, and 52R, the first bottom walls 51B and 52B, and the first side wall 54R. The divided portions are respectively referred to as a first section 511 and a second section 521. The first section 511 corresponds to a portion surrounded by the first peripheral walls 51L, 51F, and 51S, the first side wall 54R, the first bottom wall 51B, and the second side wall 55R. The second section 521 corresponds to a storage space surrounded by the first peripheral walls 52L, 52F, 52S, and 52R, the second side wall 55R, and the first bottom wall 52B. The second communicating portion 551 of the second side wall

55R causes the first section 511 and the second section 521 to be communicated with each other.

The second section 521 is positioned further to the left than the first section 511. Of three regions obtained by dividing the second section 521 into three equal sections in the front-rear direction, the region furthest to the front side is positioned, in the front-rear direction, further to the front than the front end of the first section 511. Of regions obtained by dividing the first section 511 into three equal sections in the front-rear direction, the region furthest to the rear side is positioned, in the front-rear direction, further to the rear than the rear end of the second section 521.

The second communicating portion 551 is positioned further to the front than a center position, in the front-rear direction, of the first section 511. On the other hand, the first communicating portions 541 and 542 are positioned further to the rear than the center position, in the front-rear direction, of the first section 511. Thus, the first communicating portions 541 and 542, and the second communicating portion 551 are separated in the front-rear direction.

The cleaning fluid that has flowed into the second section 521 of the cleaning fluid vessel 5A via the inflow port 520 moves to the front along the inclination of the first bottom wall 52B. The cleaning fluid passes through the second communicating portion 551 of the second side wall 55R, and moves into the first section 511 of the cleaning fluid vessel 5A. Further, in the first section 511, the cleaning fluid moves along the inclination of the first bottom wall 51B toward the discharge port 510 at the rear. The position 54P is disposed at a position lower than the position 52P, and thus, the cleaning fluid that has flowed into the cleaning fluid vessel 5A via the inflow port 520 further flows toward the vicinity of the first communicating portions 541 to 543. The fluid surface of the cleaning fluid that has accumulated in the cleaning fluid vessel 5A rises until it reaches the same height as the first bottom portions 541B, 542B, and 543B, and when the cleaning fluid flows further, the cleaning fluid flows into the flushing box 5B to be described later, via the first communicating portions 541 to 543. Thus, the fluid surface of the cleaning fluid that has flowed into the cleaning fluid vessel 5A is aligned with the height of the first bottom portions 541B, 542B, and 543B, and that height is the reference fluid surface 17.

Supply Mechanism 76A and Discharge Mechanism 76B

As illustrated in FIG. 4, a supply mechanism 76A that supplies the cleaning fluid to the cleaning fluid vessel 5A, and a discharge mechanism 76B that discharges the cleaning fluid from the cleaning fluid vessel 5A are provided. The supply mechanism 76A includes a pump 78, and a solenoid 77 (refer to FIG. 10). The pump 78 is provided partway along the inflow hose connected to the inflow port 520. The solenoid 77 opens and closes a valve provided between the inflow port 520 and the pump 78 in the inflow hose. When the solenoid 77 opens the valve during the driving of the pump 78, the cleaning fluid of a cleaning fluid tank that is not illustrated flows into the inflow hose and into the cleaning fluid vessel 5A via the inflow port 520, in accordance with a pressure generated by the pump 78.

The discharge mechanism 76B includes a solenoid 79 (refer to FIG. 10) that opens and closes a valve provided in the discharge hose connected to the discharge port 510. When the solenoid 79 opens the valve in a state in which the cleaning fluid is stored in the cleaning fluid vessel 5A, the cleaning fluid is discharged to the outside via the discharge port 510.

Flushing Box 5B

As illustrated in FIG. 4 and FIG. 5, the flushing box 5B is connected to the right side of the cleaning fluid vessel 5A. The flushing box 5B receives the ink discharged from the heads 3 by the flushing operation. The flushing box 5B is communicated with the cleaning fluid vessel 5A via the first communicating portions 541 to 543 of the first side wall 54R.

The flushing box 5B includes second peripheral walls 53L, 53F, 53S, and 53R, a second bottom wall 53B, a waste liquid port 530, and flow path walls 56 and 57. The second peripheral wall 53L extends to the front from the right end of the first peripheral wall 51F, and is orthogonal to the left-right direction. The second peripheral wall 53F extends to the right from the front end of the second peripheral wall 53L, and is orthogonal to the front-rear direction. The second peripheral wall 53S extends to the right from the right end of the first peripheral wall 51S, and is orthogonal to the front-rear direction. The second peripheral wall 53R extends between the respective right ends of the second peripheral walls 53F and 53S, and is orthogonal to the left-right direction. The positions of the upper ends of each of the second peripheral walls 53L, 53F, 53S, and 53R are the same in the up-down direction.

Figure 8:
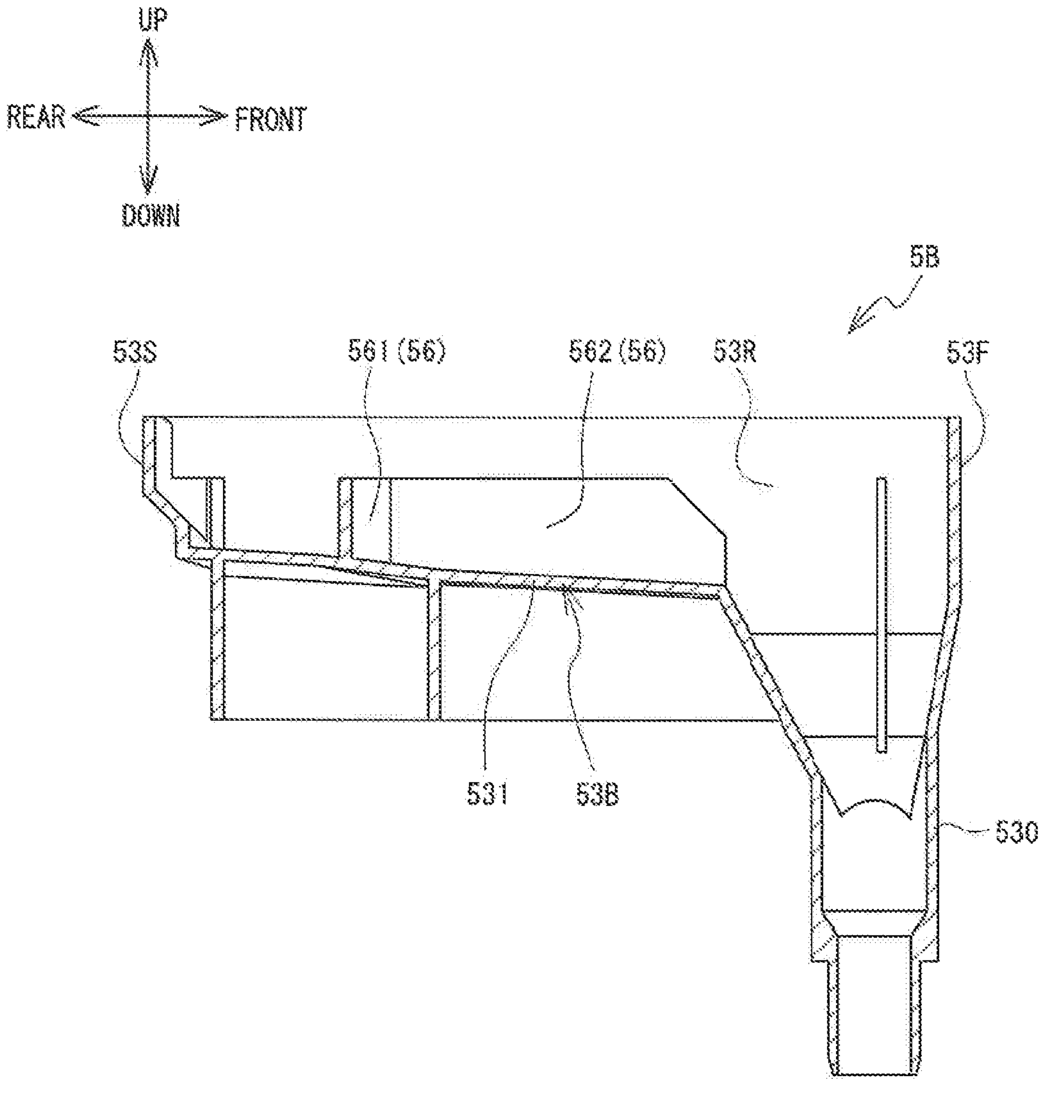
FIG. 8 is cross-sectional view as seen in the direction of arrows along a line B-B illustrated in FIG. 5.

As illustrated in FIG. 8, the second bottom wall 53B is connected to the lower ends of the second peripheral walls 53L (refer to FIG. 4), 53F, 53S, and 53R. As illustrated in FIG. 7, the second bottom wall 53B is connected to the right surface of the first side wall 54R that extends upward from the first bottom wall 51B of the cleaning fluid vessel 5A. The second bottom wall 53B is positioned higher than the first bottom walls 51B and 52B in the up-down direction.

As illustrated in FIG. 4 and FIG. 5, the waste liquid port 530, and an inclined section 531 are provided at the second bottom wall 53B. The waste liquid port 530 is provided in the vicinity of the front end of the second bottom wall 53B. The waste liquid port 530 causes the cleaning fluid in the flushing box 5B to flow to the outside. Note that, in the front-rear direction, the first communicating portions 541 to 543 of the first side wall 54R are positioned in the vicinity of the rear end of the flushing box 5B. Thus, the waste liquid port 530 provided in the vicinity of the front end of the second bottom wall 53B and the first communicating portions 541 to 543 are separated in the front-rear direction.

As illustrated in FIG. 8, the inclined section 531 is positioned, in the front-rear direction, between the first communicating portions 541 to 543 (refer to FIG. 4) of the first side wall 54R and the waste liquid port 530. The inclined section 531 is inclined such that it becomes lower from the rear end thereof in the vicinity of the first communicating portions 541 to 543 toward the front end thereof in the vicinity of the waste liquid port 530. The inclined section 531 causes the ink discharged into the flushing box 5B by the flushing operation, and the cleaning fluid that has flowed into the flushing box 5B via the first communicating portions 541 to 543 of the first side wall 54R to flow toward the waste liquid port 530.

As illustrated in FIG. 4 and FIG. 5, the flow path walls 56 and 57 extend upward from the second bottom wall 53B. The flow path walls 56 and 57 define a flow path of the cleaning fluid from the first communicating portions 541 to 543 toward the waste liquid port 530. As illustrated in FIG. 5, the flow path wall 56 includes a first extension portion 561 and a second extension portion 562. The first extension portion 561 extends diagonally to the right and to the front from the rear side of a section, of the first side wall 54R, at which the first communicating portion 542 is provided. The second extension portion 562 extends to the front from the front end of the first extension portion 561, to the vicinity of the waste liquid port 530. The flow path wall 57 includes a first extension portion 571 and a second extension portion 572. The first extension portion 571 extends diagonally to the right and to the front from the rear side of a section, of the first side wall 54R, at which the first communicating portion 543 is provided. The second extension portion 572 extends to the front from the front end of the first extension portion 571, to the vicinity of the waste liquid port 530. As illustrated in FIG. 4, in the up-down direction, the upper ends of the flow path walls 56 and 57 are positioned lower than the upper ends of the second peripheral walls 53L, 53F, 53S, and 53R, and higher than the first bottom portions 541B, 542B, and 543B of the first communicating portions 541 to 543.

As illustrated in FIG. 5, of an internal region of the flushing box 5B, a region surrounded by the second peripheral walls 53S and 53R (refer to FIG. 4) and the flow path wall 56 defines a flow path 54A corresponding to the first communicating portion 541. Of the internal region of the flushing box 5B, a region surrounded by the flow path walls 56 and 57 defines a flow path 54B corresponding to the first communicating portion 542. Of the internal region of the flushing box 5B, a region surrounded by the first side wall 54R and the flow path wall 56 defines a flow path 54C corresponding to the first communicating portion 543. Of the flow paths 54A, 54B, and 54C, sections that extend in the front-rear direction along the second extension portions 562 and 572 are disposed side by side in the main scanning direction. Thus, the flow paths 54A, 54B, and 54C can cause the ink or the cleaning fluid of the inclined section 531 to be dispersed and to flow in the main scanning direction.

Wipe Mechanism 6

Hereinafter, wiping the discharge portion 58A of the first head 3A can be referred to as wiping the first head 3A. Wiping the discharge portion 58B of the second head 3B can be referred to as wiping the second head 3B. As illustrated in FIG. 4 and FIG. 5, the first wipe mechanism 6A includes the first wiper 60A and the first power portion 61A. The first wiper 60A wipes the first head 3A by coming into contact with the discharge portion 58A of the first head 3A. The first power portion 61A moves the position of the first wiper 60A between a first contact position (refer to FIG. 4) and a first non-contact position (refer to FIG. 7) to be described later. The second wipe mechanism 6B includes the second wiper 60B and the second power portion 61B. The second wiper 60B wipes the second head 3B by coming into contact with the discharge portion 58B of the second head 3B. The second power portion 61B moves the position of the second wiper 60B between a second contact position (refer to FIG. 4) and a second non-contact position (refer to FIG. 7) to be described later. The first wipe mechanism 6A and the second wipe mechanism 6B have the same configuration. Hereinafter, insofar as there is no particular description thereof, each of directions are defined by a state in which the first wiper 60A is disposed at the first contact position and the second wiper 60B is disposed at the second contact position.

The first wiper 60A of the first wipe mechanism 6A includes a first foam wiper 62A, a first rubber wiper 63A, and a base portion 65A. The base portion 65A is housed in the first section 511 of the cleaning fluid vessel 5A and extends in the front-rear direction. As illustrated in FIG. 5, a sealing portion 661A is provided at the front end of the base portion 65A. The sealing portion 661A includes a circular flat surface portion at the front end thereof. The flat surface portion is orthogonal to the front-rear direction. A rotation shaft 641A extends from the flat surface portion of the sealing portion 661A toward the front. As illustrated in FIG. 4, the rotation shaft 641A enters into the first support portion 513 of the first peripheral wall 51F from the rear, and protrudes to the front. As illustrated in FIG. 5, a sealing portion 662A is provided at the rear end of the base portion 65A. The sealing portion 662A includes a circular flat surface portion at the rear end thereof. The flat surface portion is orthogonal to the front-rear direction. A rotation shaft 642A extends from the flat surface portion of the sealing portion 662A toward the rear. The rotation shaft 642A enters into the first support portion 514 (refer to FIG. 4) of the first peripheral wall 51S from the front, and protrudes to the rear.

The rotation shafts 641A and 642A are rotatably supported by the first support portions 513 and 514. Thus, the first wiper 60A is rotatably supported by the first support portions 513 and 514, via the rotation shafts 641A and 642A. The sealing portions 661A and 662A suppress the cleaning fluid stored in the storage space 512 of the cleaning fluid vessel 5A from flowing out via the first support portions 513 and 514.

As illustrated in FIG. 4 and FIG. 5, of the rotation shaft 641A, a section that protrudes further to the front than the first peripheral wall 51F is coupled to a gear 645A. The gear 645A meshes with a first gear group 612A of the first power portion 61A to be described later. Of the rotation shaft 642A, a section that protrudes further to the rear than the first peripheral wall 51S is coupled to a rotator 68. The rotator 68 can come into contact with a contactor 73A (refer to FIG. 6) of a first sensor 73 to be described later.

The first foam wiper 62A and the first rubber wiper 63A are held by the base portion 65A. The first foam wiper 62A has a plate shape that is long in the front-rear direction, and is orthogonal to the left-right direction. The first foam wiper 62A is a wiper formed of a porous material, such as a resin foam or the like, and has absorbent properties. The first rubber wiper 63A is disposed to the right of the first foam wiper 62A. The first rubber wiper 63A includes a plate-shaped support portion that is long in the front-rear direction, and extends upward from the support portion. A groove that extends in the up-down direction is formed in the right surface of the first rubber wiper 63A. The first rubber wiper 63A is made of rubber. A section of the first foam wiper 62A from the center thereof in the up-down direction to the lower end thereof, and the support portion of the first rubber wiper 63A are held by the base portion 65A. A section of the first foam wiper 62A from the center thereof in the up-down direction to the upper end thereof, and a plurality of protrusions of the first rubber wiper 63A protrude upward from the base portion 65A. Hereinafter, insofar as there is no particular description thereof, it is assumed that the first foam wiper 62A and the first rubber wiper 63A indicate, of the whole of the respective members, the sections thereof protruding from the base portion 65A. Each of the upper ends of the first foam wiper 62A and the first rubber wiper 63A are referred to as a tip end.

As illustrated in FIG. 4 and FIG. 5, the second wiper 60B of the second wipe mechanism 6B includes a second foam wiper 62B, a second rubber wiper 63B, and a base portion 65B. The base portion 65B is housed in the second section 521 of the cleaning fluid vessel 5A and extends in the front-rear direction. As illustrated in FIG. 5, a sealing portion 661B is provided at the front end of the base portion 65B. The sealing portion 661B includes a circular flat surface portion at the front end thereof. The flat surface portion is orthogonal to the front-rear direction. A rotation shaft 641B extends from the flat surface portion of the sealing portion 661B toward the front. As illustrated in FIG. 4, the rotation shaft 641B enters into the second support portion 523 of the first peripheral wall 52F from the rear, and protrudes to the front. As illustrated in FIG. 5, a sealing portion 662B is provided at the rear end of the base portion 65B. The sealing portion 662B includes a circular flat surface portion at the rear end thereof. The flat surface portion is orthogonal to the front-rear direction. A rotation shaft 642B extends from the flat surface portion of the sealing portion 662B toward the rear. The rotation shaft 642B enters into the second support portion 524 (refer to FIG. 4) of the first peripheral wall 52S from the front, and protrudes to the rear.

The rotation shafts 641B and 642B are rotatably supported by the second support portions 523 and 524. Thus, the second wiper 60B is rotatably supported by the second support portions 523 and 524, via the rotation shafts 641B and 642B. The sealing portions 661B and 662B suppress the cleaning fluid stored in the storage space 512 of the cleaning fluid vessel 5A from flowing out via the second support portions 523 and 524.

As illustrated in FIG. 4 and FIG. 5, of the rotation shaft 641B, a section that protrudes further to the front than the first peripheral wall 52F is coupled to a gear 645B. The gear 645B meshes with a second gear group 612B of the second power portion 61B to be described later. Of the rotation shaft 642B, a section that protrudes further to the rear than the first peripheral wall 52S is coupled to a rotator 69. The rotator 69 can come into contact with a contactor 74A (refer to FIG. 6) of a second sensor 74 to be described later.

The second foam wiper 62B and the second rubber wiper 63B are held by the base portion 65B. The second foam wiper 62B is formed of the same material and has the same shape as the first foam wiper 62A. The second rubber wiper 63B is formed of the same material and has the same shape as the first rubber wiper 63A. Hereinafter, insofar as there is no particular description thereof, it is assumed that the second foam wiper 62B and the second rubber wiper 63B indicate, of the whole of the respective members, the sections thereof protruding from the base portion 65B. Each of the upper ends of the second foam wiper 62B and the second rubber wiper 63B are referred to as a tip end.

Of two respective regions obtained by dividing the first wiper 60A into two equal sections in the front-rear direction, a region on the front side overlaps, in the sub-scanning direction, with a region on the rear side, of two respective regions obtained by dividing the second wiper 60B into two equal sections in the front-rear direction. In other words, the front end of the first wiper 60A is positioned between the front end and the rear end of the second wiper 60B in the sub-scanning direction. The rear end of the second wiper 60B is positioned between the front end and the rear end of the first wiper 60A in the sub-scanning direction. The overlapping region of the first wiper 60A and the second wiper 60B in the sub-scanning direction is referred to as a wiper overlap region. An overlapping region of the discharge portion 58A of the first head 31A and the discharge portion 58B of the second head 31B in the sub-scanning direction is referred to as a head overlap region. In the sub-scanning direction, respective positions of the front end of the wiper overlap region and the front end of the head overlap region are aligned, or the front end of the wiper overlap region is positioned further to the front. In the sub-scanning direction, the rear end of the wiper overlap region and the rear end of the head overlap region are aligned, or the rear end of the wiper overlap region is positioned further to the rear. In other words, the wiper overlap region and the head overlap region overlap in the sub-scanning direction.

As illustrated in FIG. 5, a position C51 of the center, in the main scanning direction, of the second wiper 60B is defined. A position C52 of the left end of the flushing box 5B is defined. An interval between the positions C51 and C52 is defined as an interval L50 between the second wiper 60B and the flushing box 5B in the main scanning direction. At this time, the interval L30 (refer to FIG. 3) between the first head 3A and the second head 3B in the main scanning direction is greater than the interval L50.

As illustrated in FIG. 4 and FIG. 5, the first power portion 61A is provided with a first motor 611A (refer to FIG. 6) and the first gear group 612A. The first motor 611A is provided below the first section 511 of the cleaning fluid vessel 5A, and is fixed to the rear surface of the support wall 500A. The first motor 611A is, for example, a stepping motor. A rotation shaft of the first motor 611A is inserted, from the rear, through a hole provided in the support wall 500A, and protrudes further to the front than the support wall 500A. The first gear group 612A includes a plurality of gears arrayed in the up-down direction. The first gear group 612A is rotatably supported by the support wall 500A. The gear positioned lowermost, of the first gear group 612A, meshes with a gear 610A coupled to the rotation shaft of the first motor 611A. The gear positioned uppermost, of the first gear group 612A, meshes with the gear 645A coupled to the rotation shaft 641A of the first wiper 60A.

The first gear group 612A transmits the power of the first motor 611A to the first wiper 60A, and causes the first wiper 60A to rotate. Due to the rotation, the first wiper 60A moves between the first contact position (refer to FIG. 4) and the first non-contact position (refer to FIG. 7). A rotation direction when the first wiper 60A rotates from the first contact position to the first non-contact position is not limited, but in the present embodiment, the rotation direction is the counter-clockwise direction as seen from the front. A rotation direction when the first wiper 60A rotates from the first non-contact position to the first contact position is not limited, but in the present embodiment, the rotation direction is the clockwise direction as seen from the front.

The second power portion 61B is provided with a second motor 611B and the second gear group 612B. The second motor 611B is provided below the second section 521 of the cleaning fluid vessel 5A, and is fixed to the rear surface of the support wall 500B. The second motor 611B is, for example, a stepping motor. A rotation shaft of the second motor 611B is inserted, from the rear, through a hole provided in the support wall 500B, and protrudes further to the front than the support wall 500B. The second gear group 612B includes a plurality of gears arrayed in the up-down direction. The second gear group 612B is rotatably supported by the support wall 500B. The gear positioned lowermost, of the second gear group 612B, meshes with a gear 610B coupled to the rotation shaft of the second motor 611B. The gear positioned uppermost, of the second gear group 612B, meshes with the gear 645B coupled to the rotation shaft 641B of the second wiper 60B.

The second gear group 612B transmits the power of the second motor 611B to the second wiper 60B, and causes the second wiper 60B to rotate. Due to the rotation, the second wiper 60B moves between the second contact position (refer to FIG. 4) and the second non-contact position (refer to FIG. 7). A rotation direction when the second wiper 60B rotates from the second contact position to the second non-contact position is not limited, but in the present embodiment, the rotation direction is the counter-clockwise direction as seen from the front. A rotation direction when the second wiper 60B rotates from the second non-contact position to the second contact position is not limited, but in the present embodiment, the rotation direction is the clockwise direction as seen from the front.

Contact Positions

As illustrated in FIG. 4, the second foam wiper 62B, the second rubber wiper 63B, the first foam wiper 62A, and the first rubber wiper 63A are aligned in this order from the left to the right. The tip ends of the first foam wiper 62A and the first rubber wiper 63A that are at the first contact position, and of the second foam wiper 62B and the second rubber wiper 63B that are at the second contact position are oriented upward, respectively, and protrude higher than the upper ends of the first peripheral walls 51L, 51F, 51S, 52L, 52F, 52S, and 52R (refer to FIG. 4) of the cleaning fluid vessel 5A. In other words, the first contact position is a position at which the first foam wiper 62A and the first rubber wiper 63A protrude upward and can come into contact with the discharge portion 58A of the first head 3A. The second contact position is a position at which the second foam wiper 62B and the second rubber wiper 63B protrude upward and can come into contact with the discharge portion 58B of the second head 3B. At the first contact position and the second contact position, the first foam wiper 62A, the first rubber wiper 63A, the second foam wiper 62B, and the second rubber wiper 63B are respectively positioned higher than the reference fluid surface 17. Thus, when the cleaning fluid is stored in the storage space 512 of the cleaning fluid vessel 5A, each of the first foam wiper 62A, the first rubber wiper 63A, the second foam wiper 62B, and the second rubber wiper 63B is not in contact with the cleaning fluid. Hereinafter, when no distinction is made between the first contact position and the second contact position, they are collectively referred to as the contact positions.

Non-Contact Positions

As illustrated in FIG. 7, the tip ends of the first foam wiper 62A and the first rubber wiper 63A that are at the first non-contact position, and of the second foam wiper 62B and the second rubber wiper 63B that are at the second non-contact position are oriented downward, respectively. The first foam wiper 62A, the first rubber wiper 63A, the second foam wiper 62B, and the second rubber wiper 63B are respectively positioned lower than the upper ends of the first peripheral walls 51L, 51F, 51S, 52L, 52F, 52S, and 52R (refer to FIG. 4) of the cleaning fluid vessel 5A. In other words, the first non-contact position is a position at which the first foam wiper 62A and the first rubber wiper 63A are oriented downward and cannot come into contact with the discharge portion 58A of the first head 3A. The second non-contact position is a position at which the second foam wiper 62B and the second rubber wiper 63B are oriented downward and cannot come into contact with the discharge portion 58B of the second head 3B. At the first non-contact position and the second non-contact position, the first wiper 60A is housed in the first section 511 of the cleaning fluid vessel 5A and the second wiper 60B is housed in the second section 521 of the cleaning fluid vessel 5A.

The first foam wiper 62A and the first rubber wiper 63A that are at the first non-contact position, and the second foam wiper 62B and the second rubber wiper 63B that are at the second non-contact position are respectively positioned lower than the reference fluid surface 17. Thus, when the cleaning fluid is stored in the storage space 512 of the cleaning fluid vessel 5A, the first foam wiper 62A, the first rubber wiper 63A, the second foam wiper 62B, and the second rubber wiper 63B are respectively in contact with the cleaning fluid. Hereinafter, when no distinction is made between the first non-contact position and the second non-contact position, they are collectively referred to as the non-contact positions. At the non-contact positions, it is sufficient that each of the wipers 62A, 63A, 62B, and 63B is not in contact with each of the discharge portions 58A and 58B of the heads 3A and 3B, and that the wipers 62A, 63A, 62B, and 63B are not oriented downward, such as being oriented horizontally or the like.

Intermediate Positions

Figure 9:
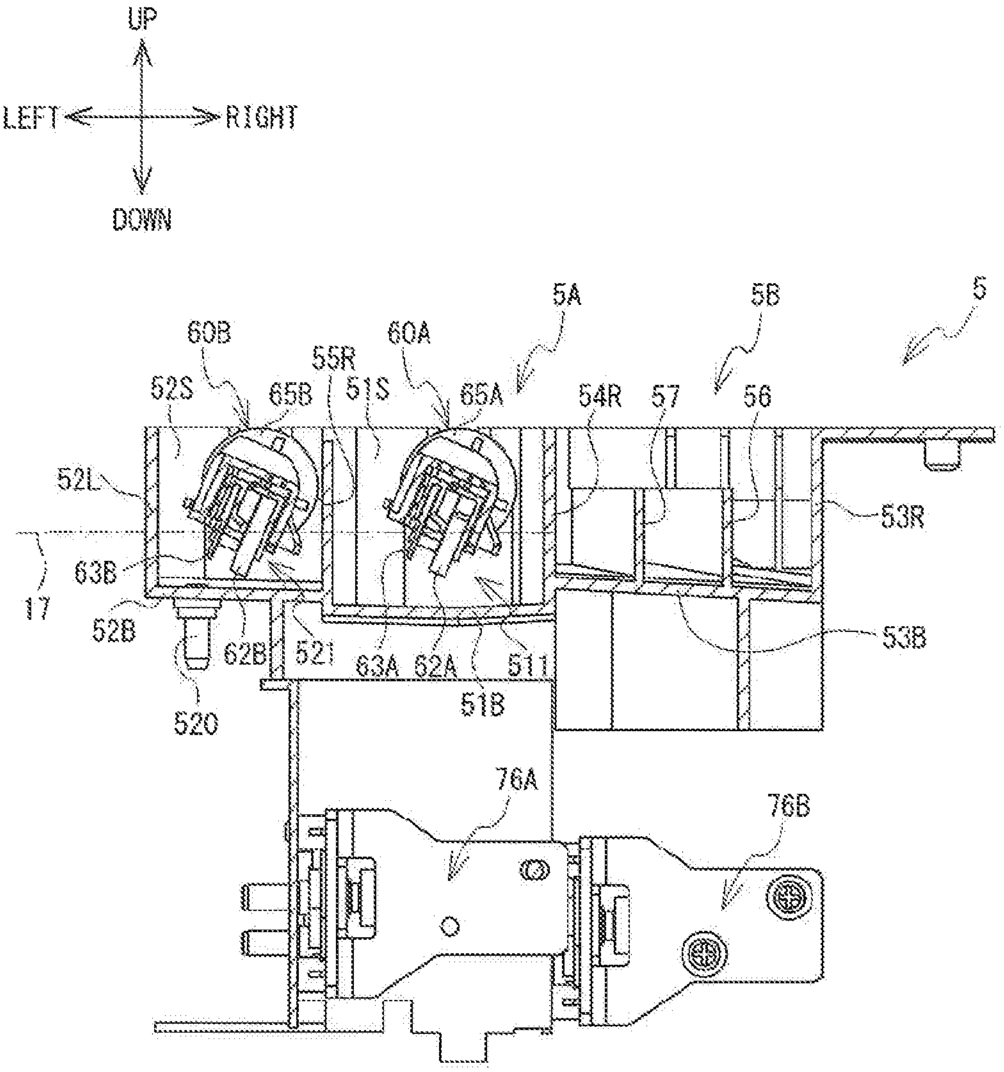
FIG. 9 is a cross-sectional view as seen in the direction of arrows along a line C-C illustrated in FIG. 5, when the first wiper and the second wiper are in an intermediate position.

FIG. 9 illustrates a state in which the first wiper 60A is positioned at a first intermediate position and the second wiper 60B is positioned at a second intermediate position. The first intermediate position is a position between the first contact position (refer to FIG. 4) and the first non-contact position (refer to FIG. 7). For example, when seen from the front, the first intermediate position is a position at which the first wiper 60A has rotated by approximately 30° in the clockwise direction from the first non-contact position. The second intermediate position is a position between the second contact position (refer to FIG. 4) and the second non-contact position (refer to FIG. 7). For example, when seen from the front, the second intermediate position is a position at which the second wiper 60B has rotated by approximately 30° in the clockwise direction from the second non-contact position. Hereinafter, when no distinction is made between the first intermediate position and the second intermediate position, they are collectively referred to as intermediate positions.

The tip ends of each of the first foam wiper 62A, the first rubber wiper 63A, the second foam wiper 62B, and the second rubber wiper 63B that are at the intermediate positions are oriented diagonally downward and to the left. The first foam wiper 62A, the first rubber wiper 63A, the second foam wiper 62B, and the second rubber wiper 63B are respectively positioned lower than the reference fluid surface 17. Thus, when the cleaning fluid is stored in the storage space 512 of the cleaning fluid vessel 5A, each of the first foam wiper 62A, the first rubber wiper 63A, the second foam wiper 62B, and the second rubber wiper 63B is in contact with the cleaning fluid.

First Sensor 73, Second Sensor 74

As illustrated in FIG. 6, the first sensor 73 is provided at the rear surface of the first peripheral wall 51S of the cleaning fluid vessel 5A and the second sensor 74 is provided at the rear surface of the first peripheral wall 52S. The first sensor 73 and the second sensor 74 are contact-type position sensors provided, respectively, with the contactors 73A and 74A that protrude upward.

In a state in which the first wiper 60A is at the first contact position, the rotator 68 is in contact, from above, with the contactor 73A of the first sensor 73. Since the rotator 68 is formed protruding from an axial center of the rotation shaft 642A only partially in the radial direction, when the first wiper 60A moves from the first contact position to the first non-contact position, the rotator 68 rotates in the clockwise direction as seen from the rear, and separates from the contactor 73A of the first sensor 73. In other words, in a state in which the first wiper 60A is not at the first contact position, the rotator 68 is separated from the contactor 73A of the first sensor 73, to the left.

In a state in which the second wiper 60B is at the second contact position, the rotator 69 is in contact, from above, with the contactor 74A of the second sensor 74. Since the rotator 69 is formed protruding from an axial center of the rotation shaft 642B only partially in the radial direction, when the second wiper 60B moves from the second contact position to the second non-contact position, the rotator 69 rotates in the clockwise direction as seen from the rear, and separates from the contactor 74A of the second sensor 74. In other words, in a state in which the second wiper 60B is not at the second contact position, the rotator 69 is separated from the contactor 74A of the second sensor 74, to the left.

Electrical Configuration

Figure 10:
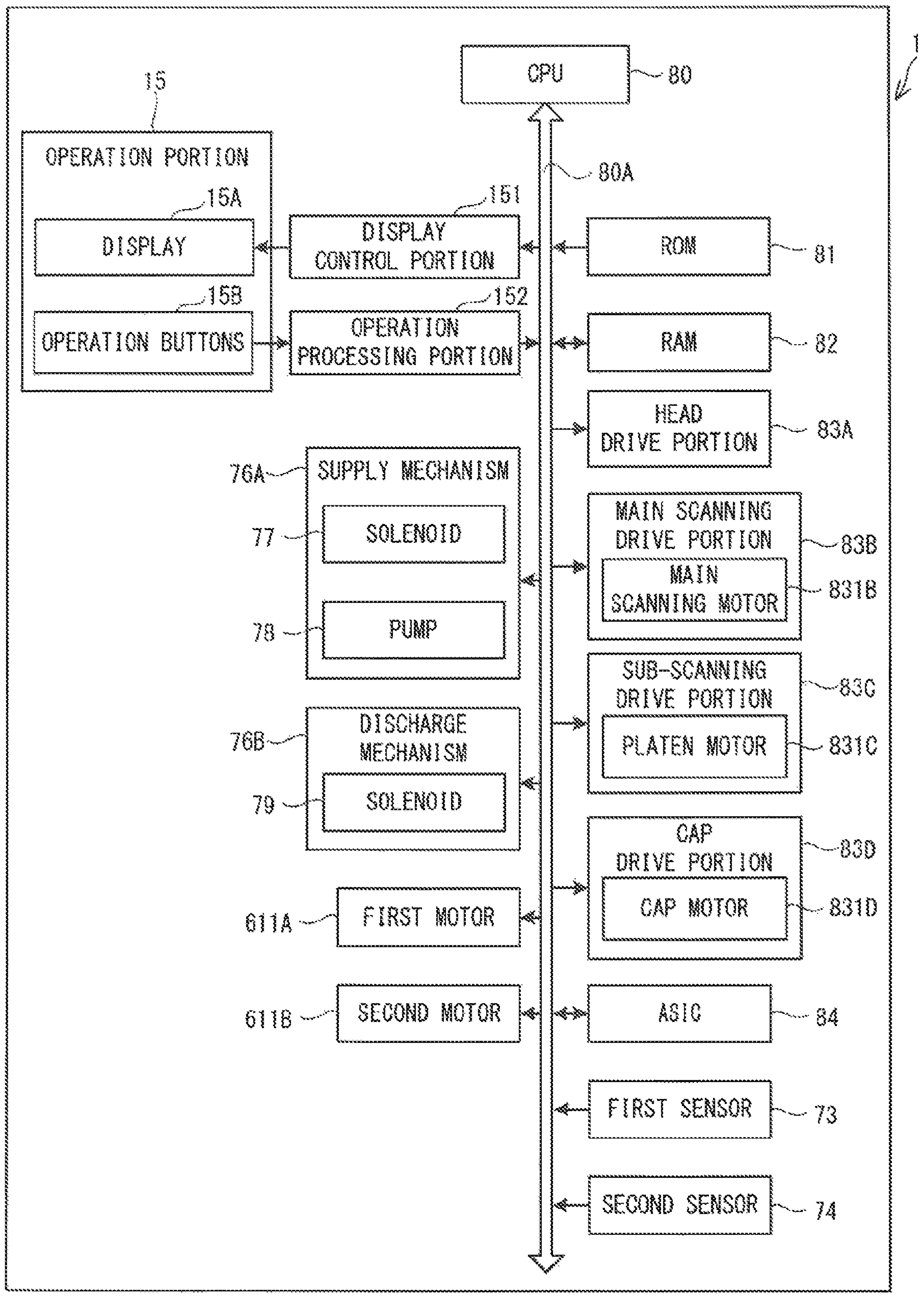
FIG. 10 is a block diagram illustrating an electrical configuration of the printer.

The electrical configuration of the printer 1 will be described with reference to FIG. 10. The printer 1 is provided with a CPU 80 that controls the printer 1. A ROM 81, a RAM 82, a head drive portion 83A, a main scanning drive portion 83B, a sub-scanning drive portion 83C, a cap drive portion 83D, an ASIC 84, a display control portion 151, an operation processing portion 152, the supply mechanism 76A, the discharge mechanism 76B, the first motor 611A, the second motor 611B, the first sensor 73, and the second sensor 74 are electrically connected to the CPU 80 via a bus 80A.

A control program used by the CPU 80 to control operations of the printer 1, default values, and the like are stored in the ROM 81. Various data, flags and the like used by the control program are temporarily stored in the RAM 82. The ASIC 84 controls the head drive portion 83A, the main scanning drive portion 83B, the sub-scanning drive portion 83C, and the cap drive portion 83D. The head drive portion 83A drives piezoelectric elements provided in the heads 3 (the first head 3A and the second head 3B) that discharge the ink, and causes the ink to be discharged from ink nozzles. The main scanning drive portion 83B includes at least a main scanning motor 831B, and moves the carriage 30 in the main scanning direction by driving of the main scanning motor 831B. The sub-scanning drive portion 83C includes at least the platen motor 831C, and moves the platen 12 and the tray 13 (refer to FIG. 1) in the sub-scanning direction by the driving of the platen motor 831C. The cap drive portion 83D includes at least a cap motor 831D, and moves the cap mechanism 40 in the up-down direction by the driving of the cap motor 831D. The main scanning motor 831B, the platen motor 831C, and the cap motor 831D are stepping motors.

The display control portion 151 drives the display 15A of the operation portion 15, under the control of the CPU 80, and causes an image to be displayed. The operation processing portion 152 detects an operation on the operation buttons 15B of the operation portion 15. The pump 78 of the supply mechanism 76A supplies the cleaning fluid to the cleaning fluid vessel 5A via the inflow hose between cleaning fluid vessel 5A and the inflow port 520. A tube pump is used as the pump 78, for example. The solenoid 77 opens and closes the value provided at the inflow hose. The solenoid 79 of the discharge mechanism 76B opens and closes the valve provided at the discharge hose connected to the discharge port 510. As a result of being driven, the first motor 611A moves the first wiper 60A between the first contact position and the first non-contact position. As a result of being driven, the second motor 611B moves the second wiper 60B between the second contact position and the second non-contact position. The first sensor 73 outputs an ON signal in the state in which the rotator 68 is in contact with the contactor 73A, and outputs an OFF signal in the state in which the rotator 68 is not in contact with the contactor 73A. The second sensor 74 outputs an ON signal in the state in which the rotator 69 is in contact with the contactor 74A, and outputs an OFF signal in the state in which the rotator 69 is not in contact with the contactor 74A.

Periodic Processing

Figure 11:
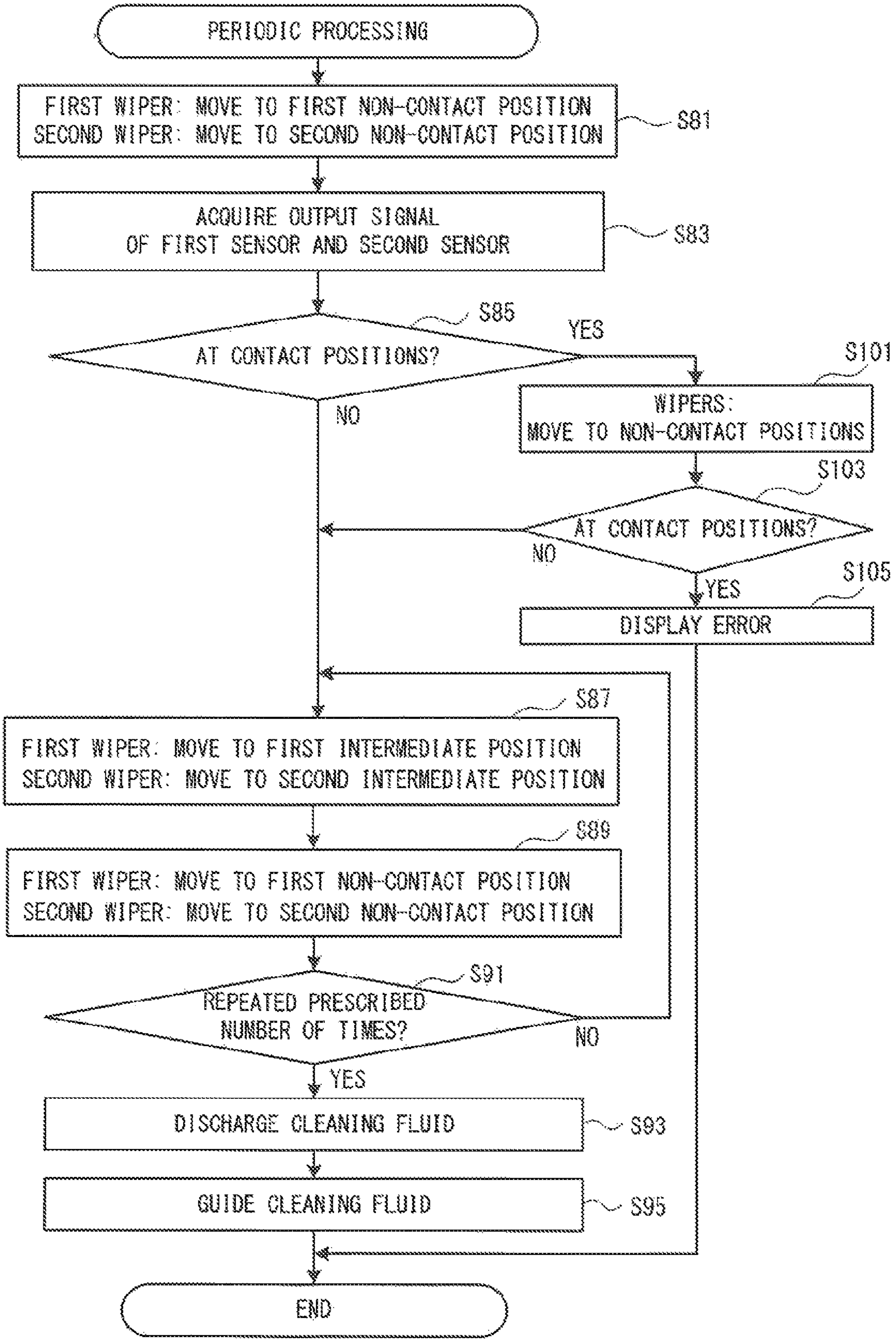
FIG. 11 is a flowchart of periodic processing.

Periodic processing performed by the CPU 80 of the printer 1 will be described with reference to FIG. 11. By reading out and executing the control program stored in the ROM 81 at a predetermined period (24 hours, for example), the CPU 80 periodically executes the periodic processing. Note that, at the start of the periodic processing, it is assumed that the cleaning fluid is held in the cleaning fluid vessel 5A, the solenoid 77 of the supply mechanism 76A closes the valve of the inflow hose connected to the inflow port 520, the driving of the pump 78 is stopped, and the solenoid 79 of the discharge mechanism 76B closes the value of the discharge hose connected to the discharge port 510.

The CPU 80 drives the first motor 611A and moves the first wiper 60A to the first non-contact position, and drives the second motor 611B and moves the second wiper 60B to the second non-contact position (step S81). The movement of the first wiper 60A and the second wiper 60B may be started at the same time, or the movement of one of the first wiper 60A or the second wiper 60B may be started in advance of the other. The CPU 80 starts processing to acquire the signals output by the first sensor 73 and the second sensor 74 at a predetermined period (one second, for example) (step S83). The CPU 80 determines whether at least one of the first wiper 60A and the second wiper 60B is at the contact position (step S85). When the CPU 80 acquires the OFF signal as the signal output by the first sensor 73, and acquires the OFF signal as the signal output by the second sensor 74, the CPU 80 determines that the first wiper 60A is not positioned at the first contact position and the second wiper 60B is not positioned at the second contact position (no at step S85). In this case, the CPU 80 determines that the movement of the wipers 60 to the non-contact positions by the processing at step S81 is successful, and advances the processing to step S87.

When the CPU 80 acquires the ON signal from at least one of the first sensor 73 and the second sensor 74, the CPU 80 determines that at least one of the first wiper 60A and the second wiper 60B is at the contact position (yes at step S85). In this case, the CPU 80 determines that the movement of the wipers 60 to the non-contact positions by the processing at step S81 has failed, and once more moves the wipers 60 to the non-contact positions. The CPU 80 drives the first motor 611A and the second motor 611B corresponding to the first wiper 60A and the second wiper 60B determined to be at the contact positions, and moves the first wiper 60A and the second wiper 60B that are at the contact positions to the non-contact positions (step S101).

The CPU 80 determines whether at least one of the first wiper 60A and the second wiper 60B is at the contact position (step S103). When the CPU 80 acquires the ON signal as the signal output by at least one of the first sensor 73 and the second sensor 74, the CPU 80 determines that at least one of the first wiper 60A and the second wiper 60B is at the contact position (yes at step S103). In this case, even if the processing to move the wipers 60 to the non-contact positions at step S81 and step S101 has been repeated, at least one of the first wiper 60A and the second wiper 60B is positioned at the contact position. In this case, the CPU 80 displays, on the display 15A, an error message notifying that it has not been possible to move at least one of the first wiper 60A and the second wiper 60B to the non-contact position (step S105). The CPU 80 ends the periodic processing.

On the other hand, when the CPU 80 receives the OFF signal as the signal output by the first sensor 73 and receives the OFF signal as the signal output by the second sensor 74, the CPU 80 determines that the first wiper 60A is not positioned at the first contact position, and that the second wiper 60B is not positioned at the second contact position (no at step S103). In this case, the CPU 80 determines that the movement of the wipers 60 to the non-contact positions by the processing at step S101 is successful, and advances the processing to step S87.

The CPU 80 drives the first motor 611A and moves the first wiper 60A to the first intermediate position, and drives the second motor 611B and moves the second wiper 60B to the second intermediate position (step S87, refer to FIG. 9). Next, the CPU 80 drives the first motor 611A and moves the first wiper 60A to the first non-contact position, and drives the second motor 611B and moves the second wiper 60B to the second non-contact position (step S89, refer to FIG. 9). At step S87 and step S89, the movement of the first wiper 60A and the second wiper 60B may be started at the same time, or the movement of one of the first wiper 60A or the second wiper 60B may be started in advance of the other.

By the processing at step S87 and step S89, the first wiper 60A and the second wiper 60B reciprocate between the non-contact positions and the intermediate positions, in a state of being in contact with the cleaning fluid at positions below the reference fluid surface 17. In this way, the first wiper 60A and the second wiper 60B are cleaned by the cleaning fluid. Further, by the movement of the first wiper 60A and the second wiper 60B, the fluid surface of the cleaning fluid fluctuates. In this way, the cleaning fluid in the cleaning fluid vessel 5A flows into the flushing box 5B via the first communicating portions 541 to 543 of the first side wall 54R. The cleaning fluid flows toward the waste liquid port 530 along the flow paths 54A to 54C of the flushing box 5B, and cleans the second bottom wall 53B of the flushing box 5B. After that, the cleaning fluid is discharged from the waste liquid port 530.

By repeating the processing at step S87 and step S89 a prescribed number of times (ten times, for example), the CPU 80 determines whether the first wiper 60A and the second wiper 60B have been moved between the non-contact positions and the intermediate positions the prescribed number of times (step S91). When the number of times that the processing at step S87 and step S89 has been repeated is less than the prescribed number of times (no at step S91), the CPU 80 returns the processing to step S87, and repeats the processing at step S87 and step S89. When the number of times that the processing at step S87 and step S89 has been repeated is equal to or greater than the prescribed number of times (yes at step S91), the CPU 80 advances the processing to step S93.

By repeating the processing at step S87 and step S89, the first wiper 60A, the second wiper 60B, and the flushing box 5B are cleaned by the cleaning fluid. Further, impurities, such as pigment particles and the like in the ink that have precipitated inside the cleaning fluid vessel 5A are agitated by the movement of the first wiper 60A and the second wiper 60B, and are caused to float in the cleaning fluid.

The CPU 80 drives the solenoid 79 of the discharge mechanism 76B, and opens the valve of the discharge hose connected to the discharge port 510. In this way, the CPU 80 discharges the cleaning fluid stored in the storage space 512 of the cleaning fluid vessel 5A (step S93). At this time, the impurities in the state of floating in the cleaning fluid are also discharged along with the cleaning fluid. After discharging the cleaning fluid, the CPU 80 drives the solenoid 77 of the supply mechanism 76A and opens the valve of the inflow hose connected to the inflow port 520. The CPU 80 starts the driving of the pump 78 of the supply mechanism 76A. In this way, the CPU 80 supplies the cleaning fluid supplied by the pump 78 to the cleaning fluid vessel 5A via the inflow port 520 (step S95).

The amount of the cleaning fluid supplied to the cleaning fluid vessel 5A by the processing at step S95 is greater than the amount of the cleaning fluid discharged from the cleaning fluid vessel 5A by the processing at step S93. Thus, even if the cleaning fluid inside the cleaning fluid vessel 5A accumulates and the fluid surface reaches the reference fluid surface 17, the cleaning fluid is additionally supplied to the cleaning fluid vessel 5A. As a result, the cleaning fluid flows into the flushing box 5B via the first communicating portions 541 to 543. The cleaning fluid flows along the flow paths 54A to 54C of the flushing box 5B, and cleans the second bottom wall 53B of the flushing box 5B. After a predetermined amount of the cleaning fluid is supplied to the cleaning fluid vessel 5A, the CPU 80 stops the driving of the pump 78, and closes, using the solenoid 77, the valve of the inflow hose connected to the inflow port 520. In this way, the CPU 80 stops the supply of the cleaning fluid to the cleaning fluid vessel 5A. The CPU 80 ends the periodic processing. By periodically performing the periodic processing, the cleaning fluid is periodically supplied to the cleaning fluid vessel 5A.

Main Processing

Main processing performed by the CPU 80 of the printer 1 will be described with reference to FIG. 12 to FIG. 20. When a command to perform a maintenance function of the printer 1 or a print command is input via the operation buttons 15B, or when a predetermined timing at which the execution of the maintenance function is programmed to be activated is reached, the main processing is started by the CPU 80 reading out and executing the control program stored in the ROM 81. Note that, at the start of the main processing, it is assumed that a state is obtained, by performing the periodic processing (refer to FIG. 11), in which the cleaning fluid is held in the cleaning fluid vessel 5A. Note also that, when the periodic processing and the main processing are performed at the same time, the CPU 80 prioritizes performing the main processing. Further, it is assumed that the carriage 30 is at the left end reference position (refer to FIG. 14).

In a similar manner to step S81 of the periodic processing, the CPU 80 drives the first motor 611A and moves the first wiper 60A to the first non-contact position. The CPU 80 drives the second motor 611B and moves the second wiper 60B to the second non-contact position (step S11). The CPU 80 drives the main scanning drive portion 83B and starts to move the carriage 30 at the reference position toward the right (an arrow Y13 illustrated in FIG. 14) (step S13). In this way, the carriage 30 moves to the right toward the first wiper 60A and the second wiper 60B of the cleaning assembly 5. Hereinafter, of both directions of the main scanning direction, the direction of the movement of the carriage 30 from the reference position (to the right) is referred to as downstream and the direction opposite to downstream (to the left) is referred to as upstream.

Figure 15:
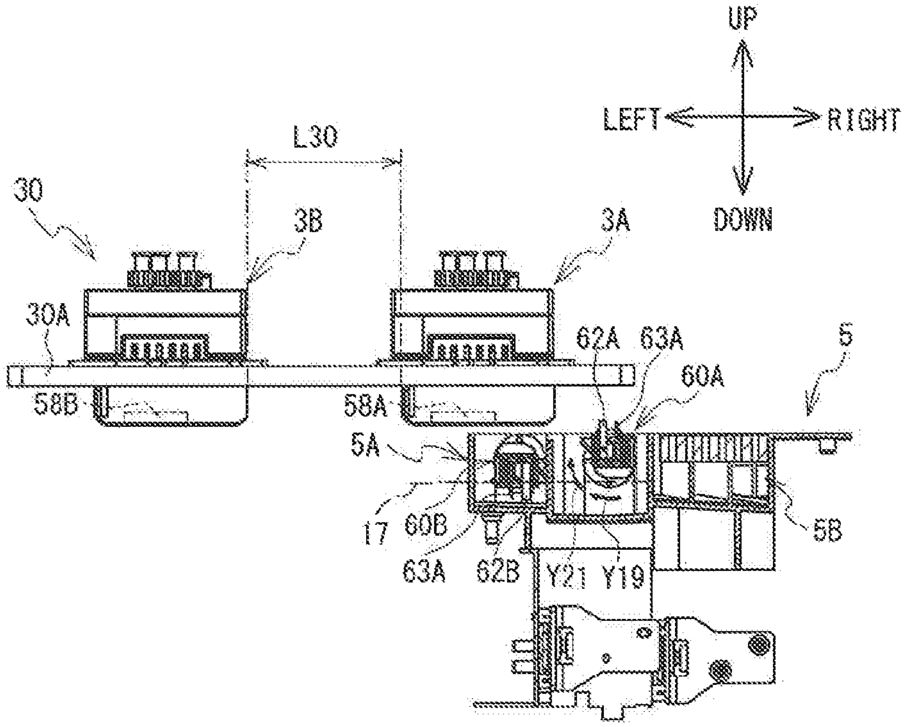
FIG. 15 is a diagram illustrating a positional relationship between the cleaning assembly and the carriage when the carriage is at a first wiping position.

The CPU 80 calculates a movement distance that the carriage 30 has moved from the reference position, on the basis of a number of pulses of a pulse signal output for rotating the main scanning motor 831B of the main scanning drive portion 83B. On the basis of the calculated movement distance, the CPU 80 determines whether the carriage 30 has moved to a first wiping position (refer to FIG. 15) (step S15). As illustrated in FIG. 15, the first wiping position is defined as a position of the carriage 30 when the discharge portion 58A of the first head 3A is disposed upstream of the first wiper 60A in the main scanning direction, and the position of the downstream end of the discharge portion 58A is aligned with the position of the upstream end of the second wiper 60B in the main scanning direction.

Figure 12:
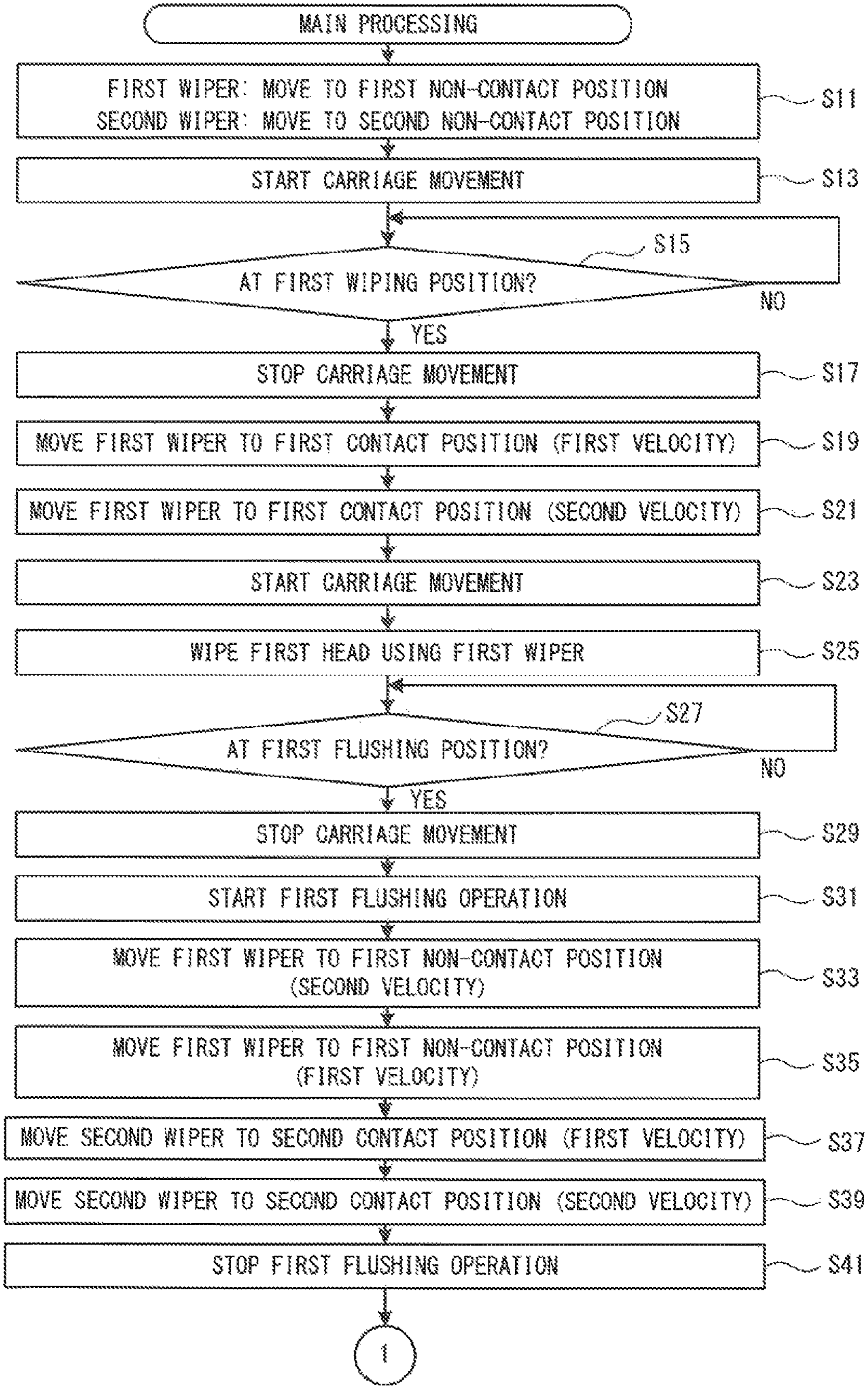
FIG. 12 is a flowchart of main processing.

As illustrated in FIG. 12, when it is determined that the carriage 30 has not moved to the first wiping position (no at step S15), the CPU 80 returns the processing to step S15. When it is determined that the carriage 30 has moved to the first wiping position (yes at step S15), the CPU 80 drives the main scanning drive portion 83B and stops the movement of the carriage 30 started by the processing at step S13 (step S17).

The CPU 80 controls the first power portion 61A, by driving the first motor 611A, and moves the first wiper 60A that is at the first non-contact position to the first contact position (step S19, step S21). Note that the second wiper 60B is held as it is at the second non-contact position. At this time, the CPU 80 identifies the position of the first wiper 60A on the basis of the number of pulses of a pulse signal output for rotating the first motor 611A. As illustrated in FIG. 15, during a period until the first wiper 60A that is moving upward from the first non-contact position passes through the reference fluid surface 17, the CPU 80 controls a rotation velocity of the first motor 611A such that a movement velocity of the first wiper 60A is a first velocity (step S19). After the first wiper 60A has passed through the reference fluid surface 17, and during a period until the first wiper 60A that is moving further upward reaches the first contact position, the CPU 80 controls the rotation velocity of the first motor 611A such that the movement velocity of the first wiper 60A is a second velocity that is faster than the first velocity (step S21). As illustrated in FIG. 15, a direction of movement of the first wiper 60A when moving at the first velocity is illustrated by an arrow Y19. A direction of movement of the first wiper 60A when moving at the second velocity is illustrated by an arrow Y21. As a result of the control at step S19 and step S21, the movement velocity of the first wiper 60A becomes faster (the second velocity) when moving in a state of not being in contact with the cleaning fluid than the movement velocity (the first velocity) when moving in a state of being in contact with the cleaning fluid. After moving the first wiper 60A to the first contact position, the CPU 80 stops the driving of the first motor 611A and maintains the first wiper 60A at the first contact position.

Figure 16:
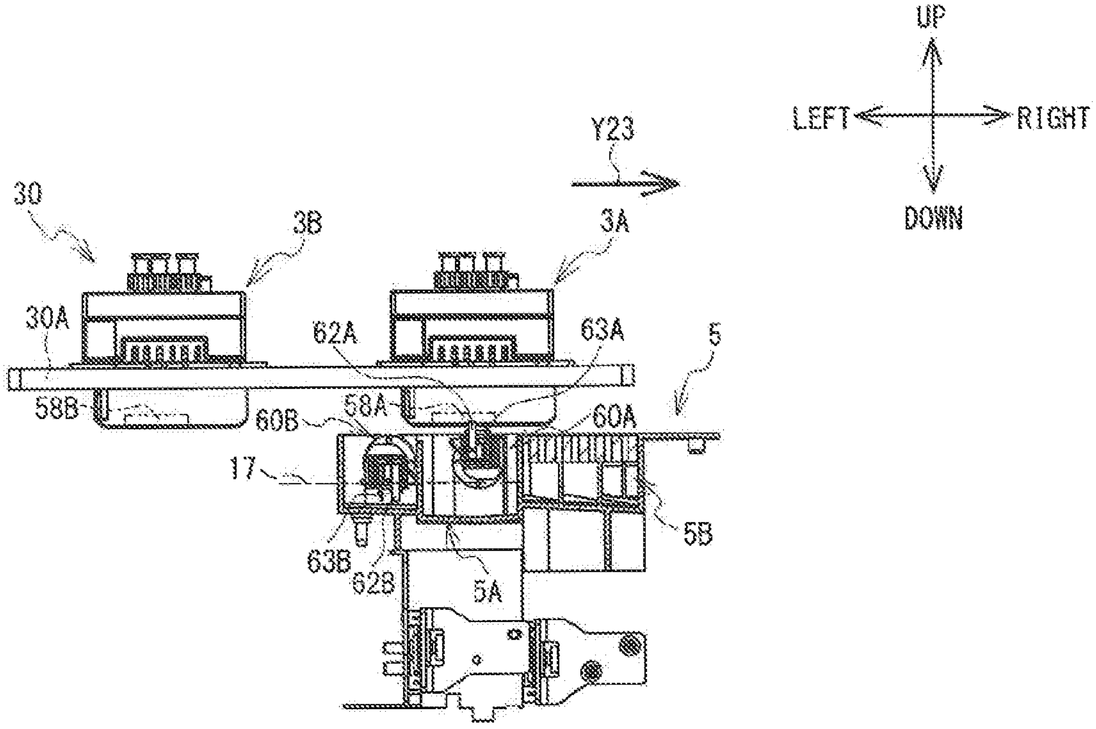
FIG. 16 is a diagram illustrating a positional relationship between the cleaning assembly and the carriage when a first head is being wiped.

As illustrated in FIG. 12, the CPU 80 controls the main scanning drive portion 83B and starts the downstream movement of the carriage 30 that is at the first wiping position (an arrow Y23 illustrated in FIG. 16) (step S23). As a result, the CPU 80 performs processing causing the first wiper 60A to come into contact with the discharge portion 58A of the first head 3A and wipe the first head 3A (step S25). As illustrated in FIG. 16, in the course of the movement of the carriage 30, the discharge portion 58A of the first head 3A passes over the first wiper 60A that is at the first contact position. The first wiper 60A comes into contact with the discharge portion 58A of the first head 3A in the order of the first foam wiper 62A and the first rubber wiper 63A.

Figure 17:
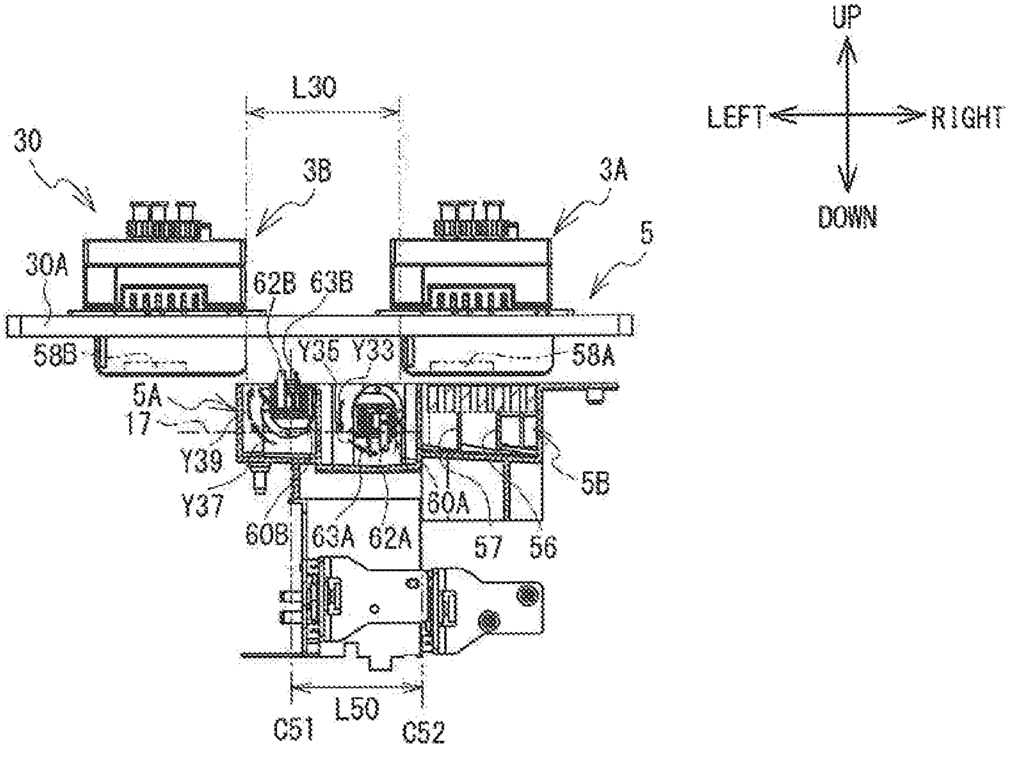
FIG. 17 is a diagram illustrating a positional relationship between the cleaning assembly and the carriage that is at a first flushing position.

The CPU 80 calculates a movement distance that the carriage 30 has moved from the first wiping position, on the basis of the number of pulses of the pulse signal output for rotating the main scanning motor 831B of the main scanning drive portion 83B. As illustrated in FIG. 12, on the basis of the calculated movement distance, the CPU 80 determines whether the carriage 30 has moved to a first flushing position (step S27). As illustrated in FIG. 17, the first flushing position is defined as a position of the carriage 30 when the discharge portion 58A of the first head 3A is positioned above the flushing box 5B.

As illustrated in FIG. 12, when it is determined that the carriage 30 has not moved to the first flushing position (no at step S27), the CPU 80 returns the processing to step S27. When it is determined that the carriage 30 has moved to the first flushing position (yes at step S27), the CPU 80 controls the main scanning drive portion 83B and stops the movement of the carriage 30 started by the processing at step S23 (step S29). Note that, as illustrated in FIG. 17, the interval L30 between the first head 3A and the second head 3B in the main scanning direction is greater than the interval L50 between the second wiper 60B and the flushing box 5B in the main scanning direction. Thus, in the state in which the carriage 30 is disposed at the first flushing position, the discharge portion 58B of the second head 3B is disposed upstream of the second wiper 60B in the main scanning direction.

As illustrated in FIG. 12, the CPU 80 controls the head drive portion 83A and drives the piezoelectric element provided in the first head 3A, and starts the discharge of the ink toward the flushing box 5B from the discharge portion 58A of the first head 3A (step S31). Hereinafter, this operation is referred to as a first flushing operation.

While the first flushing operation is being performed, the CPU 80 controls the first power portion 61A by driving the first motor 611A, and moves the first wiper 60A that is at the first contact position to the first non-contact position (step S33, step S35). At this time, the CPU 80 identifies the position of the first wiper 60A on the basis of the number of pulses of the pulse signal output for rotating the first motor 611A. On the basis of the identified position of the first wiper 60A, the CPU 80 identifies a period over which the first wiper 60A moves downward from the first contact position until immediately before the first wiper 60A passes through the reference fluid surface 17, and controls the rotation velocity of the first motor 611A such that the movement velocity of the first wiper 60A during this period is the second velocity (step S33). The CPU 80 controls the rotation velocity of the first motor 611A such that the movement velocity of the first wiper 60A is the first velocity from when the first wiper 60A moves further downward and passes through the reference fluid surface 17 to when the first wiper 60A subsequently reaches the first non-contact position (step S35). As illustrated in FIG. 17, a direction of movement of the first wiper 60A when moving at the second velocity at step S33 is illustrated by an arrow Y33 illustrated in FIG. 17, and a direction of movement of the first wiper 60A at step S35 when moving at the first velocity is illustrated by an arrow Y35. As a result of the control at step S33 and step S35, the movement velocity of the first wiper 60A becomes slower (the first velocity) when moving while in contact with the cleaning fluid than the movement velocity (the second velocity) when moving in a state of not being in contact with the cleaning fluid. After moving the first wiper 60A to the first non-contact position, the CPU 80 stops the driving of the first motor 611A and maintains the first wiper 60A at the first non-contact position.

As illustrated in FIG. 12, next, the CPU 80 controls the second power portion 61B by driving the second motor 611B, and moves the second wiper 60B that is at the second non-contact position to the second contact position (step S37, step S39). At this time, the CPU 80 identifies the position of the second wiper 60B on the basis of the number of pulses of a pulse signal output for rotating the second motor 611B. On the basis of the identified position of the second wiper 60B, the CPU 80 identifies a period until the second wiper 60B that is moving upward from the second non-contact position passes through the reference fluid surface 17, and controls a rotation velocity of the second motor 611B such that a movement velocity of the second wiper 60B during this period is the first velocity (step S37). After the second wiper 60B has passed through the reference fluid surface 17, and during a period until the second wiper 60B that is moving further upward reaches the second contact position, the CPU 80 controls the rotation velocity of the second motor 611B such that the movement velocity of the second wiper 60B is the second velocity (step S39). As illustrated in FIG. 17, a direction of movement of the second wiper 60B when moving at the first velocity at step S37 is illustrated by an arrow Y37. A direction of movement of the second wiper 60B when moving at the second velocity at step S39 is illustrated by an arrow Y39. As a result of the control at step S37 and step S39, the movement velocity (the second velocity) of the second wiper 60B becomes faster when moving in a state of not being in contact with the cleaning fluid than the movement velocity (the first velocity) when moving while being in contact with the cleaning fluid. After moving the second wiper 60B to the second contact position, the CPU 80 stops the driving of the second motor 611B and maintains the second wiper 60B at the second contact position.

As illustrated in FIG. 12, after moving the second wiper 60B to the second contact position, the CPU 80 controls the head drive portion 83A and stops the driving of the piezoelectric element provided in the first head 3A, and ends the first flushing operation (step S41).

Figure 13:
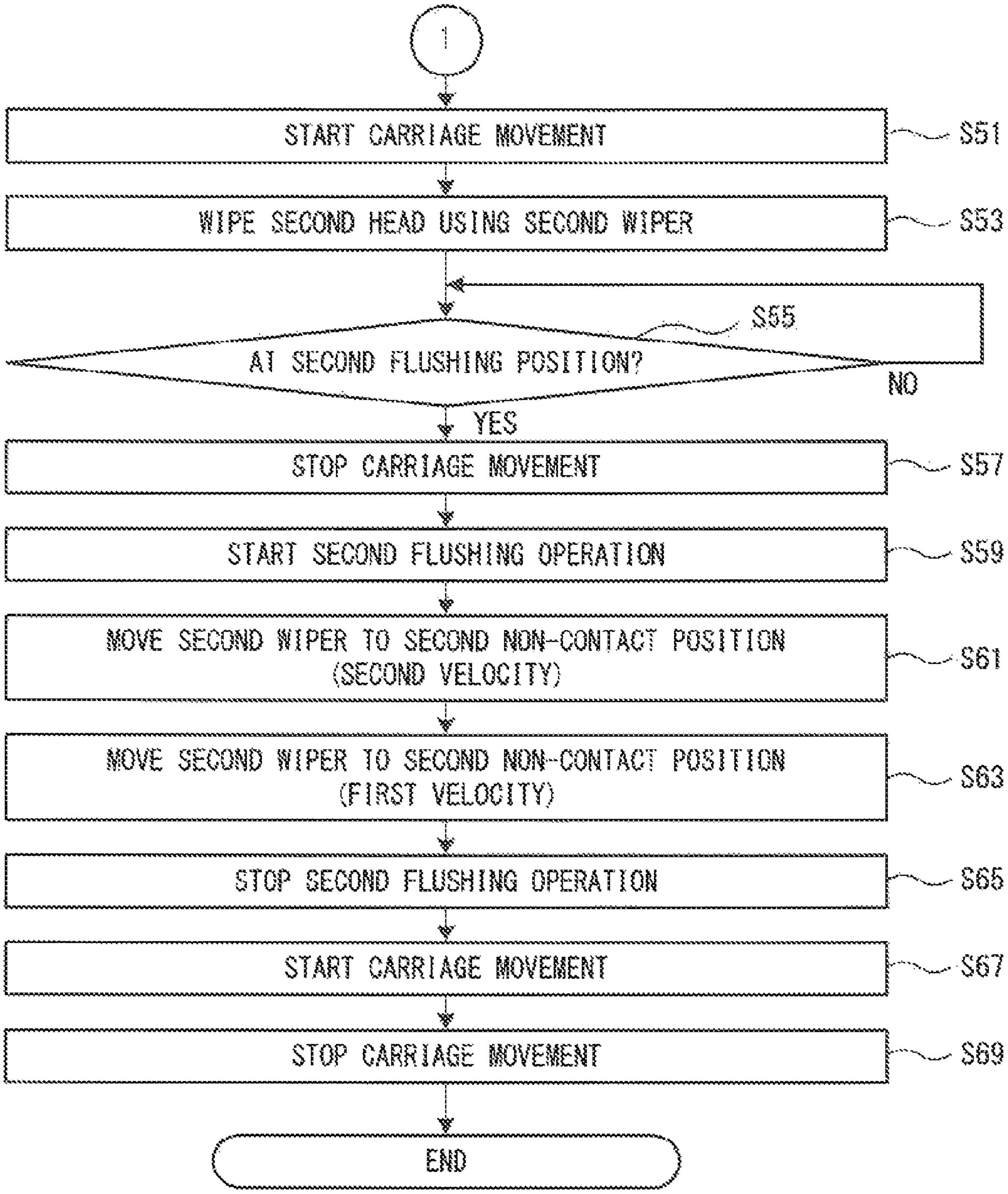
FIG. 13 is a flowchart of the main processing and is a continuation of FIG. 12.
Figure 18:
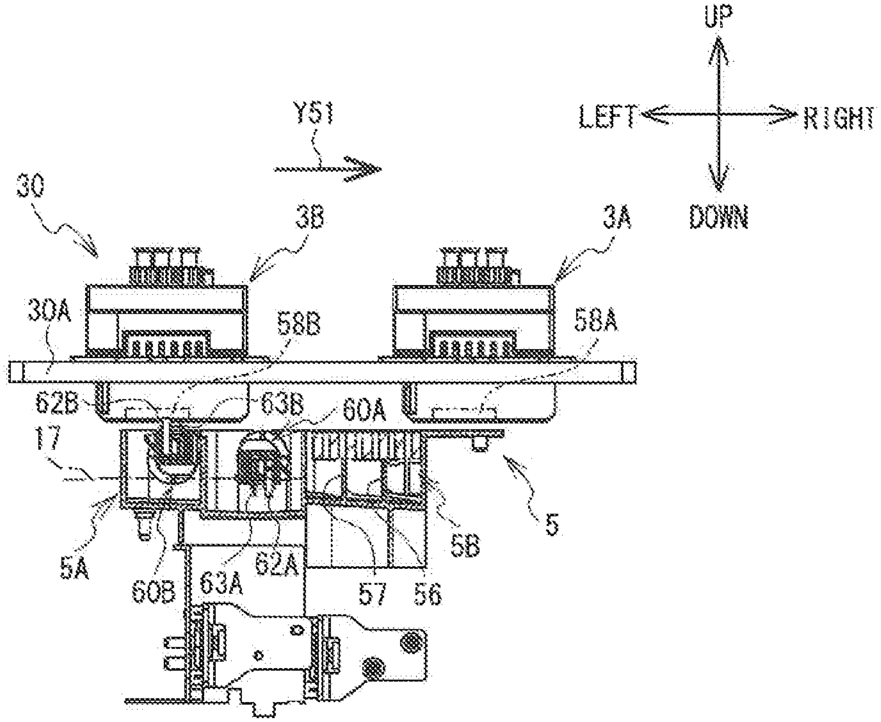
FIG. 18 is a diagram illustrating a positional relationship between the cleaning assembly and the carriage when a second head is being wiped.

As illustrated in FIG. 13, after stopping the first flushing operation, the CPU 80 controls the main scanning drive portion 83B and starts the downstream movement of the carriage 30 that is at the first flushing position (an arrow Y51 illustrated in FIG. 18) (step S51). As a result, the CPU 80 performs processing causing the second wiper 60B to come into contact with the discharge portion 58B of the second head 3B and wipe the second head 3B (step S53). As illustrated in FIG. 18, in the course of the movement of the carriage 30, the discharge portion 58B of the second head 3B passes over the second wiper 60B that is at the second contact position. The second wiper 60B comes into contact with the discharge portion 58B of the second head 3B in the order of the second foam wiper 62B and the second rubber wiper 63B.

Figure 19:
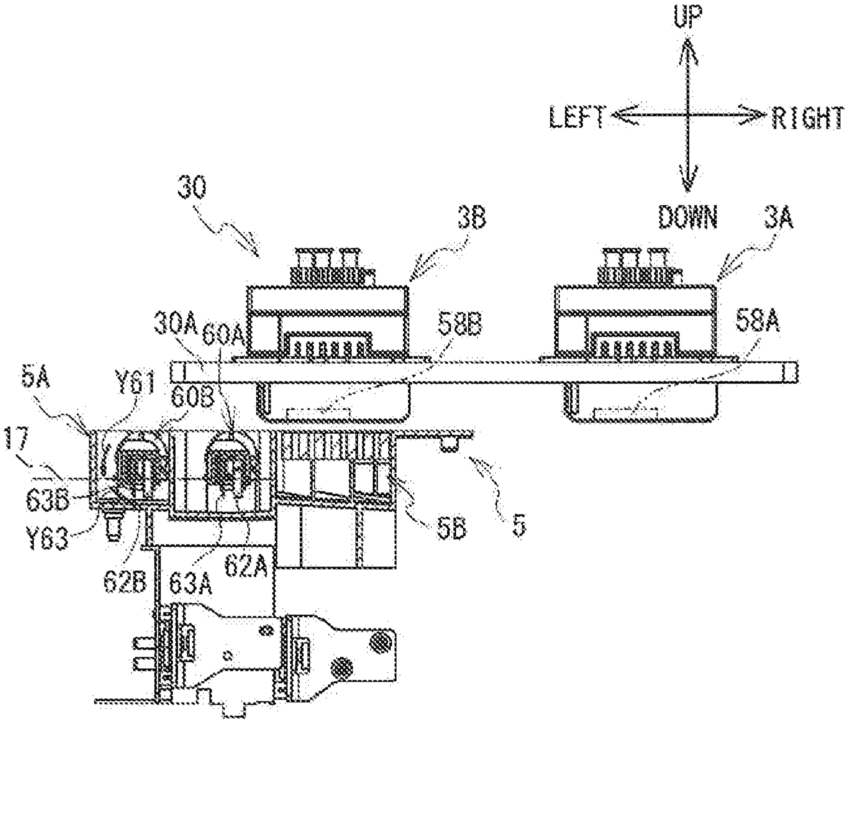
FIG. 19 is a diagram illustrating a positional relationship between the cleaning assembly and the carriage that is at a second flushing position.

The CPU 80 calculates a movement distance that the carriage 30 has moved from the first flushing position, on the basis of the number of pulses of the pulse signal output for rotating the main scanning motor 831B of the main scanning drive portion 83B. As illustrated in FIG. 13, on the basis of the calculated movement distance, the CPU 80 determines whether the carriage 30 has moved to a second flushing position (step S55). As illustrated in FIG. 19, the second flushing position is defined as a position of the carriage 30 when the discharge portion 58B of the second head 3B is positioned above the flushing box 5B.

As illustrated in FIG. 13, when it is determined that the carriage 30 has not moved to the second flushing position (no at step S55), the CPU 80 returns the processing to step S55. When it is determined that the carriage 30 has moved to the second flushing position, (yes at step S55), the CPU 80 controls the main scanning drive portion 83B and stops the movement of the carriage 30 started by the processing at step S51 (step S57).

The CPU 80 controls the head drive portion 83A and drives the piezoelectric element provided in the second head 3B, and starts the discharge of the ink toward the flushing box 5B from the discharge portion 58B of the second head 3B (step S59). Hereinafter, this operation is referred to as a second flushing operation.

Figure 20:
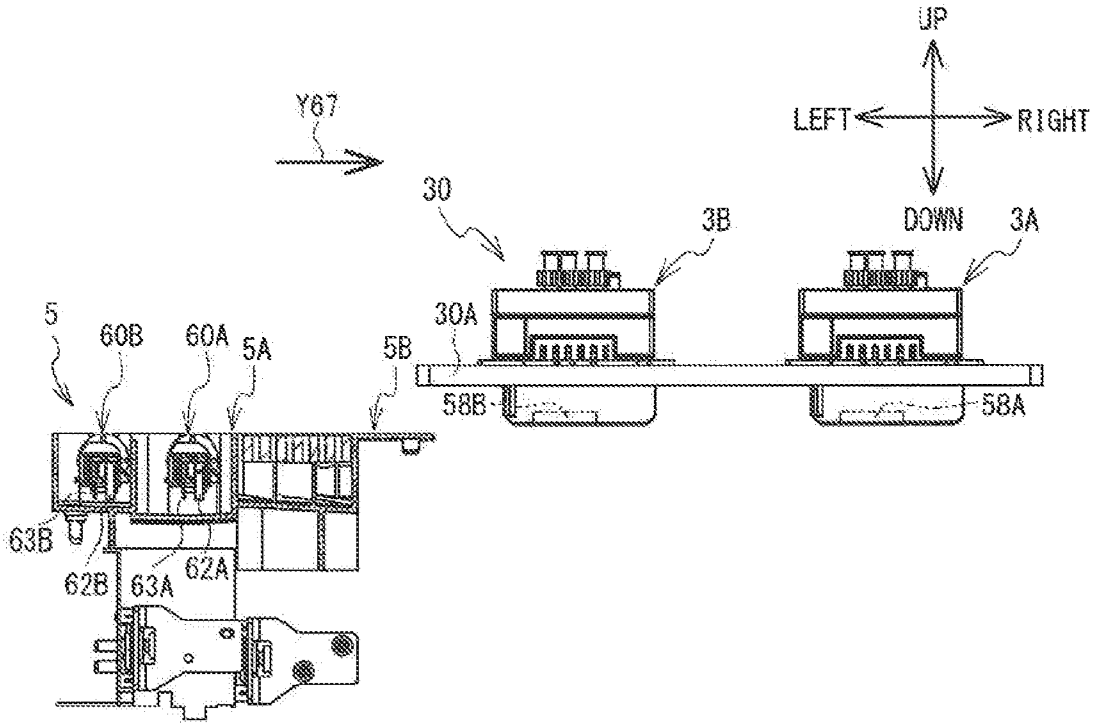
FIG. 20 is a diagram illustrating a positional relationship between the cleaning assembly and the carriage when the main processing ends.

While the second flushing operation is being performed, the CPU 80 controls the second power portion 61B by driving the second motor 611B, and moves the second wiper 60B that is at the second contact position to the second non-contact position (step S61, step S63). At this time, the CPU 80 identifies the position of the second wiper 60B on the basis of the number of pulses of the pulse signal output for rotating the second motor 611B. On the basis of the identified position of the second wiper 60B, the CPU 80 identifies a period over which the second wiper 60B moves downward from the second contact position until immediately before the second wiper 60B passes through the reference fluid surface 17, and controls the rotation velocity of the second motor 611B such that the movement velocity of the second wiper 60B during this period is the second velocity (step S61). The CPU 80 controls the rotation velocity of the second motor 611B such that the movement velocity of the second wiper 60B is the first velocity from when the second wiper 60B moves further downward and passes through the reference fluid surface 17 to when the second wiper 60B subsequently reaches the second non-contact position (step S63). As illustrated in FIG. 20, a direction of movement of the second wiper 60B when moving at the second velocity is illustrated by an arrow Y61, and a direction of movement of the second wiper 60B when moving at the first velocity is illustrated by an arrow Y63. As a result of the control at step S61 and step S63, the movement velocity (the first velocity) of the second wiper 60B becomes slower when moving while in contact with the cleaning fluid than the movement velocity (the second velocity) when moving in a state of not being in contact with the cleaning fluid. After moving the second wiper 60B to the second non-contact position, the CPU 80 stops the driving of the second motor 611B and maintains the second wiper 60B at the second non-contact position (refer to FIG. 19).

As illustrated in FIG. 13, after moving the second wiper 60B to the second non-contact position, the CPU 80 controls the head drive portion 83A and stops the driving of the piezoelectric element provided in the second head 3B, and ends the second flushing operation (step S65). The CPU 80 starts the downstream movement of the carriage 30 that is at the second flushing position (an arrow Y67 illustrated in FIG. 20) (step S67). When the carriage 30 has moved to a downstream end of the movement path or to a predetermined position, the CPU 80 controls the main scanning drive portion 83B, and stops the movement of the carriage 30 started by the processing at step S67 (step S69). The CPU 80 ends the main processing. After the end of the main processing, predetermined processing is performed, such as performing the print processing, performing capping processing using the cap mechanism 40, or the like.

Operations and Effects of Present Embodiment

A part of the front side of the first wiper 60A and a part of the rear side of the second wiper 60B overlap in the sub-scanning direction. Further, a part of the front side portion of the discharge portion 58A of the first head 3A and a part of the rear side of the discharge portion 58B of the second head 3B overlap in the sub-scanning direction. Furthermore, in the sub-scanning direction, at least some of the overlapping portion between the first wiper 60A and the second wiper 60B overlaps with the overlapping portion between the discharge portion 58A of the first head 3A and the discharge portion 58B of the second head 3B. Thus, if the carriage 30 moves downstream, for example, in a state in which the first wiper 60A is disposed at the first contact position and the second wiper 60B is disposed at the second contact position, there is a possibility that the first wiper 60A may come into contact with the second head 3B (particularly with the rear end of the second head 3B) and that the second head 3B may become worn, and that the second wiper 60B may come into contact with the first head 3A (particularly with the front end of the first head 3A) and the first head 3A may become worn.

In contrast to this, at step S11, the CPU 80 of the printer 1 positions the second wiper 60B at the second non-contact position, and, at step S19 and step S21, positions the first wiper 60A at the first contact position. After that, at step S25, the CPU 80 moves the carriage 30 downstream and performs control such that the first head 3A passes the first wiper 60A. Since the second wiper 60B is at the second non-contact position, the second wiper 60B does not come into contact with the first head 3A before the first head 3A passes the first wiper 60A. Similarly, at step S33, the CPU 80 positions the first wiper 60A at the first non-contact position and, at step S39, positions the second wiper 60B at the second contact position. After that, at step S53, the CPU 80 moves the carriage 30 downstream and performs control such that the second head 3B passes the second wiper 60B. Since the first wiper 60A is at the first non-contact position, the first wiper 60A does not come into contact with the second head 3B after the second head 3B has passed the second wiper 60B. Thus, it is possible to suppress wear of the first wiper 60A and the second wiper 60B as a result of the first head 3A coming into contact with the second wiper 60B and the second head 3B coming into contact with the first wiper 60A. As a result, the printer 1 can wipe the heads 3 using the wipers 60 whose wear has been suppressed, and can appropriately wipe away the ink that has attached to the heads 3.

The printer 1 can switch the positions (the contact positions or the non-contact positions) of the wipers 60 by rotating the wipers 60. Thus, in comparison to a case in which the positions are switched by moving the wipers 60 in the straight line, in the printer 1, a transmission mechanism for switching the positions can be configured without using a configuration to convert the rotation of the first motor 611A and the second motor 611B into a linear movement. As a result, since the rotational driving force of the first motor 611A and the second motor 611B can be efficiently transmitted to the wipers 60, the printer 1 can easily perform the switching of the positions. Further, in the printer 1, the first wiper 60A and the first motor 611A are coupled by the first gear group 612A and the second wiper 60B and the second motor 611B are coupled by the second gear group 612B. In this way, the printer 1 can be laid out in a manner in which the first wiper 60A and the first motor 611A, and the second wiper 60B and the second motor 611B are separated from each other. Thus, a freedom of the layout of the first motor 611A and the second motor 611B in the printer 1 can be improved.

The printer 1 includes the cleaning fluid vessel 5A that is provided with the storage space 512 storing the cleaning fluid. In a state of being disposed at the non-contact positions, the first wiper 60A and the second wiper 60B are disposed inside the cleaning fluid vessel 5A. Thus, when the cleaning fluid is stored in the cleaning fluid vessel 5A, the printer 1 can clean the wipers 60 disposed at the non-contact positions.

The wipers 60 include the foam wipers (the first foam wiper 62A or the second foam wiper 62B) and the rubber wipers (the first rubber wiper 63A or the second rubber wiper 63B). Thus, since the heads 3 can be wiped a plurality of times using the foam wipers and the rubber wipers, the printer 1 can more appropriately wipe the heads 3.

In the state in which the wipers 60 are at the contact positions, the foam wipers are positioned between the rubber wipers and the cap mechanism 40 in the main scanning direction. When the carriage 30 moves downstream from the position above the cap mechanism 40 (the reference position), the heads 3 are wiped by the rubber wipers after being wiped by the foam wipers. In this case, the printer 1 can wipe the ink from the discharge portions 58A and 58B of the heads 3 using the rubber wipers, after using the cleaning fluid held in the foam wipers to wet the discharge portions 58A and 58B of the heads 3 and thus causing the discharge portions 58A and 58B to be in a state in which the ink is easily wiped away. Thus, the printer 1 can even more appropriately wipe the heads 3 using the wipers 60.

The flushing box 5B is positioned opposite to the wipers 60 from the cap mechanism 40 in the main scanning direction. The heads 3 that move downstream from the position above the cap mechanism 40 (the reference position) are positioned closer to the flushing box 5B than to the reference position, after the wiping by the wipers 60 is complete. Thus, the printer 1 can smoothly perform the flushing operation using the heads 3 that have been wiped. Further, by performing the first flushing operation using the first head 3A that has been wiped, the printer 1 can improve a cleaning effect of the first head 3A. By performing the second flushing operation using the second head 3B that has been wiped, the printer 1 can improve a cleaning effect of the second head 3B.

The interval L30 between the first head 3A and the second head 3B in the main scanning direction is greater than the interval L50 between the flushing box 5B and the second wiper 60B in the main scanning direction. As a result, when the first head 3A is positioned above the flushing box 5B, the second head 3B is positioned further to the side of the cap mechanism 40 than the second wiper 60B. Thus, after the first flushing operation using the first head 3A, the printer 1 can wipe the second head 3B using the second wiper 60B. In other words, the first flushing operation need not necessarily be performed after the second head 3B has been wiped by the second wiper 60B. It is thus possible to shorten a time period from wiping the second head 3B to performing the second flushing operation using the second head 3B. In this case, the printer 1 can suppress the ink of the second head 3B from drying out and solidifying during the period from wiping the second head 3B to performing the second flushing operation, and thus, the printer 1 can improve a cleaning effect by the second flushing operation using the second head 3B.

The printer 1 moves the second wiper 60B (step S33 to step S39) during the first flushing operation (step S31 to step S41) using the first head 3A. Further, after ending the first flushing operation, by moving the carriage 30 downstream, the printer 1 wipes the second head 3B using the second wiper 60B that is at the second contact position (step S53). In this case, in comparison to a case in which the second wiper 60B is moved after ending the first flushing operation, the printer 1 can shorten a time period from the ending of the first flushing operation to the start of wiping the second head 3B using the second wiper 60B.

MODIFIED EXAMPLES

The present disclosure is not limited to the above-described embodiment and various modifications are possible. The printer 1 may move the carriage 30 relative to the cleaning assembly 5 in the main scanning direction by moving the cleaning assembly 5 in the main scanning direction with respect to the carriage 30 that is fixed.

After moving the first wiper 60A that is at the first non-contact position to the first contact position (step S19, step S21), the printer 1 starts the downstream movement of the carriage 30 (step S23), and wipes the discharge portion 58A of the first head 3A using the first wiper 60A (step S25). A timing at which the printer 1 starts the downstream movement of the carriage 30 is not limited to being after the movement of the first wiper 60A to the first contact position is complete. The printer 1 may start the downstream movement of the carriage 30 before the movement of the first wiper 60A to the first contact position is complete. In this case, it is sufficient that the movement of the first wiper 60A to the first contact position is complete during a period until the discharge portion 58A of the first head 3A reaches a position above the first wiper 60A. Similarly, after moving the second wiper 60B that is at the second non-contact position to the second contact position (step S37, step S39), the printer 1 starts the downstream movement of the carriage 30 (step S51), and wipes the discharge portion 58B of the second head 3B using the second wiper 60B. A timing at which the printer 1 starts the downstream movement of the carriage 30 is not limited to being after the movement of the second wiper 60B to the second contact position is complete. The printer 1 may start the downstream, movement of the carriage 30 before the movement of the second wiper 60B to the second contact position is complete. In this case, it is sufficient that the movement of the second wiper 60B to the second contact position is complete during a period until the discharge portion 58B of the first head 3B reaches a position above the second wiper 60B.

The printer 1 may switch the wipers 60 between the contact positions and the non-contact positions by linearly moving the wipers 60 in the up-down direction. In this case, a cam mechanism, a rack and pinion, an air cylinder, or the like may be used as a power portion that moves the wipers 60. The wipe mechanism 6 may be directly provided on the frame body 20 of the printer 1. In this case, the wipers 60 of the wipe mechanism 6 need not necessarily be cleaned by the cleaning fluid.

The wiper 60 may include only one of the foam wiper and the rubber wiper, and need not necessarily include the other. In each of the first wiper 60A and the second wiper 60B, a plurality of the foam wipers and the rubber wipers may be provided, respectively, arrayed in the main scanning direction. In place of the foam wiper, a wiper formed from another material having absorbent properties may be used. In place of the rubber wiper, a wiper formed from another material having elastic properties may be used. In the main scanning direction, the rubber wiper may be provided between the foam wiper and the cap mechanism 40. In other words, the positions of the rubber wiper and the foam wiper may be switched in the main scanning direction.

The cleaning fluid vessel 5A and the flushing box 5B may be provided separately, and only the flushing box 5B may be movable. After the wiping by the wipers 60 is complete, the flushing box 5B may move to a position below the heads 3, from a predetermined stand-by position. After the movement of the flushing box 5B, the flushing operation may be performed by discharging the ink from the heads 3. In this case, the flushing box 5B that is at the stand-by position need not necessarily be positioned opposite to the cap mechanism 40 with respect to the wipers 60 in the main scanning direction. The printer 1 need not necessarily include the flushing operation function. In this case, the printer 1 need not necessarily be provided with the flushing box 5B.

In the state in which the carriage 30 is at the first flushing position, the right end portion of the discharge portion 58B of the second head 3B may be substantially aligned with the position, in the main scanning direction, of the second foam wiper 62B of the second wiper 60B. In this case, after the first flushing operation is ended, since the second foam wiper 62B comes into contact with the discharge portion 58B of the second head 3B immediately after the downstream movement of the carriage 30 is started, the wiping of the second head 3B by the second wiper 60B can be started more rapidly.

The printer 1 moves the first wiper 60A to the first contact position (step S19, step S21) after stopping the movement of the carriage 30 by the processing at step S17. In contrast to this, the printer 1 may move the first wiper 60A to the first contact position without stopping the carriage 30. In this case, it is sufficient that the movement of the first wiper 60A to the first contact position be complete before the discharge portion 58A of the first head 3A reaches the position above the first wiper 60A. The printer 1 moves the second wiper 60B to the second contact position (step S37, step S39) after stopping the movement of the carriage 30 by the processing at step S29. In contrast to this, the printer 1 may move the second wiper 60B to the second contact position without stopping the carriage 30. In this case, it is sufficient that the movement of the second wiper 60B to the second contact position be complete before the discharge portion 58B of the second head 3B reaches the position above the second wiper 60B.

The printer 1 may perform the first flushing operation by the processing at step S31 after starting the movement of the first wiper 60A and the second wiper 60B by the processing at step S33 to step S39. The printer 1 may perform the second flushing operation by the processing at step S59 after starting the movement of the second wiper 60B by the processing at step S61 and step S63.

A part of the front side of the first wiper 60A and a part of the rear side of the second wiper 60B need not necessarily overlap in the sub-scanning direction. For example, in the sub-scanning direction, the front end portion of the first wiper 60A may be positioned further to the rear than the rear end portion of the second wiper 60B. Further, in the sub-scanning direction, the rear end portion of the second wiper 60B may be positioned further to the rear than the front end portion of the first wiper 60A.

Figure 21:
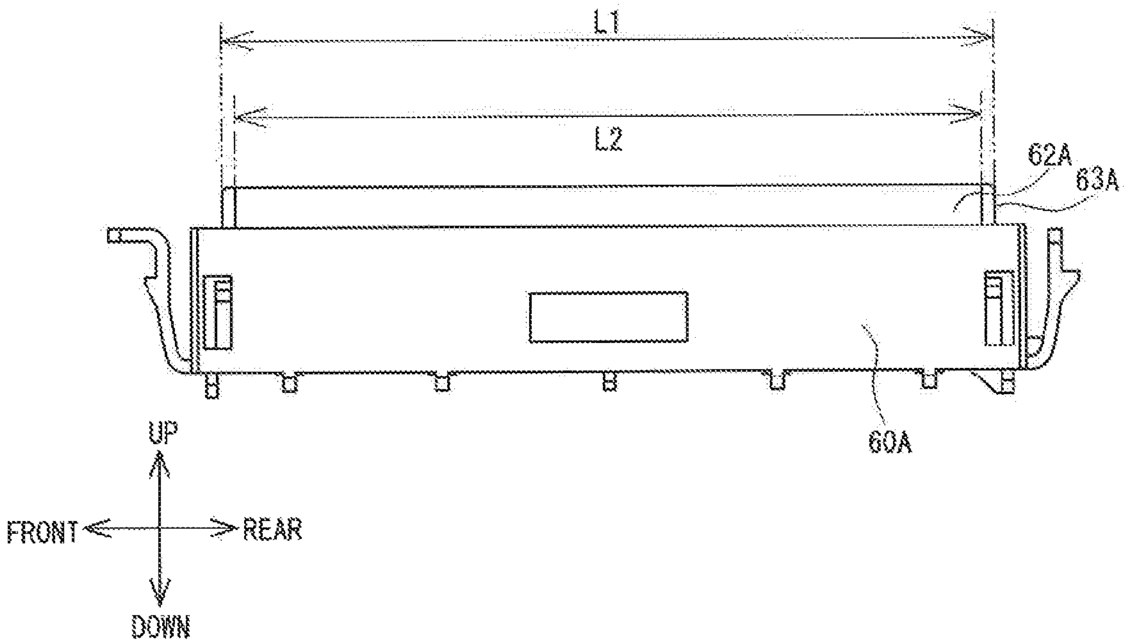
FIG. 21 is a diagram of the first wiper as seen from the left.

The first wiper 60A will be described with reference to FIG. 21. When the ink attached to the discharge portion 58A of the first head 31A is wiped by the first wiper 60A, there is a possibility that the cleaning fluid may ooze out from the first foam wiper 62A. If the cleaning fluid that has oozed out mixes with the ink, and remains on the discharge portion 58A, there is a possibility that an ink discharge failure may occur due to the mixed cleaning fluid and ink entering into the nozzles and solidifying. Further, there is a possibility that the solidified ink may cause a defect in the adhesion between the cap mechanism 40 and the discharge portion 58A. It is possible that such problems may become notable when the length of the first rubber wiper 63A in the sub-scanning direction is equal to or less than the length of the first foam wiper 62A in the sub-scanning direction. As a countermeasure to these problems, in the first wiper 60A of the present embodiment, a length L1 of the first rubber wiper 63A in the sub-scanning direction is preferably longer than a length L2 of the first foam wiper 62A in the sub-scanning direction. In this way, there is an increased possibility of the cleaning fluid that has oozed out from the first foam wiper 62A being wiped away by the first rubber wiper 63A. As a result, the possibility is reduced of the cleaning fluid that has oozed out becoming mixed with the ink and remaining on the discharge portion 58A. Further, of the cap mechanism 40 illustrated in FIG. 2, a length Lc of the cap 41 in the sub-scanning direction (not illustrated) is preferably longer than the length L2 of the first foam wiper 62A in the sub-scanning direction. In this way, even if the ink that is mixed with the cleaning fluid remains on a connection portion between the discharge portion 58A and the cap 41, there is an increased possibility that it will be wiped away by the first foam wiper 62A and the first rubber wiper 63A. As a result, the possibility is reduced of causing a defect in the adhesion between the cap mechanism 40 and the discharge portion 58A. Note that the second wiper 60B has the same configuration.

Figure 22:
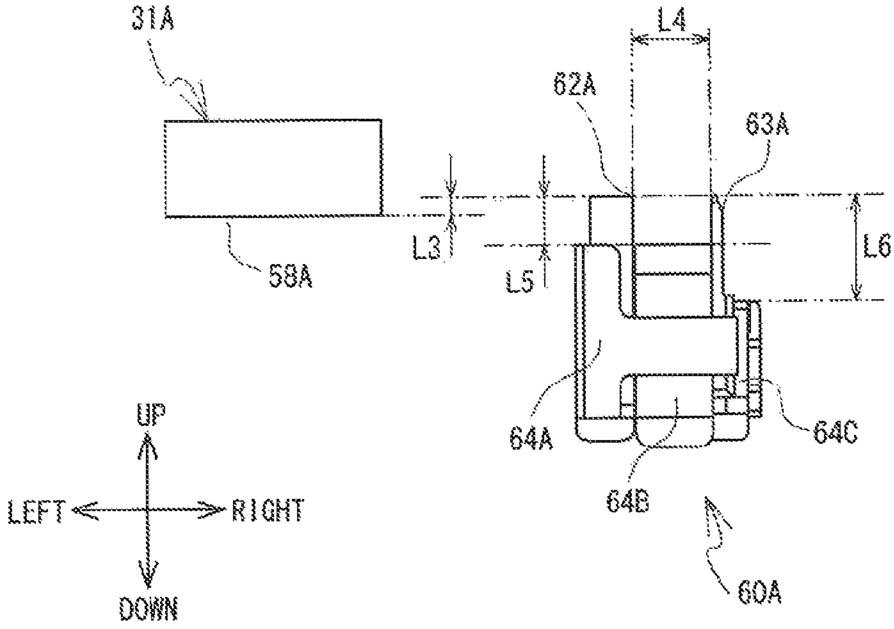
FIG. 22 is a diagram of the first wiper as seen from the front.

The positional relationship of the first wiper 60A and the first head 31A will be described with reference to FIG. 22. The first foam wiper 62A and the first rubber wiper 63A are fixed by fixing members 64A, 64B, and 64C, and are held by the base portion 65A illustrated in FIG. 4 and FIG. 5. The fixing member 64A engages with the fixing member 64C, and fixes the first foam wiper 62A from the left. The fixing member 64C fixes the first rubber wiper 63A from the right. The fixing member 64B is positioned between the fixing member 64A and the fixing member 64C, and engages with the fixing member 64A and the fixing member 64C. The fixing member 64B fixes the first foam wiper 62A from the right, and fixes the first rubber wiper 63A from the left. In a state in which the first head 31A and the first wiper 60A are not in contact with each other, the upper end of the first foam wiper 62A is provided at a position that is higher than the discharge portion 58A of the first head 31A by a distance L3. Thus, when the first foam wiper 62A wipes the discharge portion 58A, there is a possibility that the first foam wiper 62A may tilt to the right by the distance L3. In the main scanning direction, the first foam wiper 62A is separated from the first rubber wiper 63A by a distance L4. In the present embodiment, since the distance L3 is shorter than the distance L4, even if the first foam wiper 62A tilts to the right by the distance L3, it does not come into contact with the first rubber wiper 63A. Thus, when wiping the discharge portion 58A, it is possible to reduce a possibility of the first rubber wiper 63A being pressed by the first foam wiper 62A as a result of the first foam wiper 62A coming into contact with the first rubber wiper 63A, and reduce a possibility of not obtaining a sufficient contact pressure of the first rubber wiper 63A with respect to the discharge portion 58A. Note that the second wiper 60B has the same configuration.

The first rubber wiper 63A and the first foam wiper 62A protrude further upward than the fixing members 64A, 64B, and 64C. The upper end of the first foam wiper 62A is provided at a position higher than the upper end of the fixing member 64B by a distance L5. The upper end of the first rubber wiper 63A is provided at a position higher than the upper end of the fixing member 64C by a distance L6. Thus, when the first foam wiper 62A comes into contact with the discharge portion 58A, the first head 31A receives a force corresponding to the distance L5 as a result of the compression or the deformation of the first foam wiper 62A, and when the first rubber wiper 63A comes into contact with the discharge portion 58A, the first head 31A receives a force corresponding to the distance L6 as a result of the compression or the deformation of the first rubber wiper 63A. In other words, the distance L5 is the free length of the first foam wiper 62A and the distance L6 is the free length of the first rubber wiper 63A. In the present embodiment, since the distance L5 is shorter than the distance L6, the force when the first foam wiper 62A comes into contact with the discharge portion 58A is stronger than the force when the first rubber wiper 63A comes into contact with the discharge portion 58A. Thus, due to the relative stronger force when the first foam wiper 62A comes into contact with the discharge portion 58A, rattling of the first wiper 60A and rattling of the first head 31A are reduced, and the wiping of the discharge portion 58A by the first rubber wiper 63A is stable. Note that the second wiper 60B has the same configuration.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer comprising:

a carriage including a first head and a second head separated in a first direction and at least partially overlapping in a second direction orthogonal to the first direction;

a first wipe mechanism including a first wiper, and a first power portion being configured to move the first wiper between a first contact position where the first wiper is configured to contact the first head, and a first non-contact position where the first wiper is not configured to contact the first head;

a second wipe mechanism including a second wiper, and a second power portion being configured to move the second wiper between a second contact position where the second wiper is configured to contact the second head, and a second non-contact position where the second wiper is not configured to contact the second head;

a movement mechanism configured to relatively move the carriage in the first direction with respect to the first wiper and the second wiper;

a processor; and a memory storing computer-readable instructions that, when executed by the processor, cause the processor to perform processes comprising:

performing first control of controlling the first power portion and moving the first wiper to the first contact position, and controlling the second power portion and moving the second wiper to the second non-contact position;

after moving the first wiper and the second wiper by the first control, performing second control of controlling the movement mechanism and relatively moving the carriage to cause the first head to pass the first wiper at the first contact position;

performing third control of controlling the first power portion and moving the first wiper to the first non-contact position, and controlling the second power portion and moving the second wiper to the second contact position; and after moving the first wiper and the second wiper by the third control, performing fourth control of controlling the movement mechanism and relatively moving the carriage to cause the second head to pass the second wiper at the second contact position.

2. The printer according to claim 1, further comprising:

a platen;

a cap mechanism provided opposite to the platen with respect to the first wiper and the second wiper in the first direction, and including a cap configured to cover the first head and the second head; and a flushing box provided opposite to the cap mechanism with respect to the first wiper and the second wiper in the first direction.

3. The printer according to claim 2, wherein an interval between the first head and the second head in the first direction is greater than an interval between the flushing box and the second wiper in the first direction.

4. The printer according to claim 2, wherein the computer-readable instructions stored in the memory further cause the processor to perform processes comprising:

performing fifth control of controlling the movement mechanism and, after relatively moving the carriage to cause the first head to pass the first wiper at the first contact position, relatively moving the carriage to cause the first head to be positioned above the flushing box; and performing sixth control of, after relatively moving the carriage to cause the first head to be positioned above the flushing box by the fifth control, performing a first flushing operation of causing ink to be discharged from the first head into the flushing box.

5. The printer according to claim 4, wherein the third control includes controlling the first power portion and moving the first wiper to the first non-contact position and controlling the second power portion and moving the second wiper to the second contact position, while the first head is performing the first flushing operation by the sixth control.

6. The printer according to claim 4, wherein the fourth control includes relatively moving the carriage to cause the second head to pass the second wiper at the second contact position after the first flushing operation by the sixth control is ended.

7. The printer according to claim 2, wherein the computer-readable instructions stored in the memory further cause the processor to perform processes comprising:

performing seventh control of controlling the movement mechanism and, after moving the carriage to cause the second head to pass the second wiper at the second contact position, moving the carriage to cause the second head to be positioned above the flushing box; and performing eighth control of, after moving the carriage to cause the second head to be positioned above the flushing box by the seventh control, performing a second flushing operation of causing ink to be discharged from the second head into the flushing box.

8. The printer according to claim 1, further comprising:

a first support portion configured to rotatably support the first wiper; and a second support portion configured to rotatably support the second wiper, wherein the first power portion includes a first motor, and a first gear configured to transmit power of the first motor to the first wiper, and the second power portion includes a second motor, and a second gear configured to transmit power of the second motor to the second wiper.

9. The printer according to claim 1, further comprising:

a case including a wall defining a space configured to store a cleaning fluid, at least a part of the first wiper at the first non-contact position, and at least a part of the second wiper at the second non-contact position being disposed in the case.

10. The printer according to claim 1, wherein the first wiper includes a first rubber wiper made from rubber, and a first foam wiper made from a porous material, and the second wiper includes a second rubber wiper made from rubber, and a second foam wiper made from a porous material.

11. The printer according to claim 10, further comprising:

a platen; and a cap mechanism provided opposite to the platen with respect to the first wiper and the second wiper in the first direction, and including a cap configured to cover the first head and the second head, wherein when the first wiper is positioned at the first contact position, the first foam wiper is positioned between the first rubber wiper and the cap mechanism in the first direction, and when the second wiper is positioned at the second contact position, the second foam wiper is positioned between the second rubber wiper and the cap mechanism in the first direction.

12. The printer according to claim 11, wherein a length of the first rubber wiper in the second direction orthogonal to the first direction is longer than a length of the first foam wiper in the second direction orthogonal to the first direction, and a length of the second rubber wiper in the second direction orthogonal to the first direction is longer than a length of the second foam wiper in the second direction orthogonal to the first direction.

13. The printer according to claim 12, wherein the length of the first foam wiper in the second direction orthogonal to the first direction is longer than a length of the cap in the second direction orthogonal to the first direction, and the length of the second foam wiper in the second direction orthogonal to the first direction is longer than the length of the cap in the second direction orthogonal to the first direction.

14. The printer according to claim 11, wherein the first rubber wiper and the first foam wiper are fixed while being separated by a first distance in the first direction, by a first fixing member, in a state of the first rubber wiper and the first foam wiper not being in contact with the first head, a second distance, in an up-down direction, from a lower surface of the first head to an upper end of the first foam wiper is shorter than the first distance, the second rubber wiper and the second foam wiper are fixed while being separated by the first distance in the first direction, by a second fixing member, and in a state of the second rubber wiper and the second foam wiper not being in contact with the second head, the second distance, in the up-down direction, from a lower surface of the second head to an upper end of the second foam wiper is shorter than the first distance.

15. The printer according to claim 14, wherein the first rubber wiper and the first foam wiper protrude further upward than the first fixing member, a free length of the first foam wiper in the up-down direction from a first upper end of the first fixing member to the upper end of the first foam wiper is shorter than a free length of the first rubber wiper in the up-down direction from a second upper end of the first fixing member to an upper end of the first rubber wiper, the first upper end of the first fixing member contacting the first foam wiper from a first contact direction, the second upper end of the first fixing member contacting the first rubber wiper from the first contact direction, the first contact direction being a direction from the first rubber wiper to the first foam wiper in the first direction, the second rubber wiper and the second foam wiper protrude further upward than the second fixing member, and a free length of the second foam wiper in the up-down direction from a third upper end of the second fixing member to the upper end of the second foam wiper is shorter than a free length of the second rubber wiper in the up-down direction from a fourth upper end of the second fixing member to an upper end of the second rubber wiper, the third upper end of the second fixing member contacting the second foam wiper from a second contact direction, the fourth upper end of the second fixing member contacting the second rubber wiper from the second contact direction, the second contact direction being a direction from the second rubber wiper to the second foam wiper in the first direction.

16. A non-transitory computer-readable medium storing computer-readable instructions for a printer including a carriage including a first head and a second head separated in a first direction and partially overlapping in a second direction orthogonal to the first direction, a first wipe mechanism including a first wiper, and a first power portion being configured to move the first wiper between a first contact position where the first wiper is configured to contact the first head, and a first non-contact position where the first wiper is not configured to contact the first head, a second wipe mechanism including a second wiper, and a second power portion being configured to move the second wiper between a second contact position where the second wiper is configured to contact the second head, and a second non-contact position where the second wiper is not configured to contact the second head, a movement mechanism configured to move the carriage relative to the first wiper and the second wiper in the first direction, and a processor configured to control the first power portion, the second power portion, and the movement mechanism, the instructions causing a computer of the printer to perform processes comprising:

performing first control of controlling the first power portion and moving the first wiper to the first contact position, and controlling the second power portion and moving the second wiper to the second non-contact position;

after moving the first wiper and the second wiper by the first control, performing second control of controlling the movement mechanism and relatively moving the carriage to cause the first head to pass the first wiper at the first contact position;

performing third control of controlling the first power portion and moving the first wiper to the first non-contact position, and controlling the second power portion and moving the second wiper to the second contact position; and after moving the first wiper and the second wiper by the third control, performing fourth control of controlling the movement mechanism and relatively moving the carriage to cause the second head to pass the second wiper at the second contact position.

17. A print method for a printer including a carriage including two heads discharging ink, which are a first head and a second head separated in a first direction and partially overlapping in a second direction orthogonal to the first direction, a first wipe mechanism including a first wiper, and a first power portion being configured to move the first wiper between a first contact position where the first wiper is configured to contact the first head, and a first non-contact position where the first wiper is not configured to contact the first head, a second wipe mechanism including a second wiper, and a second power portion being configured to move the second wiper between a second contact position where the second wiper is configured to contact the second head, and a second non-contact position where the second wiper is not configured to contact the second head, a movement mechanism configured to move the carriage relative to the first wiper and the second wiper in the first direction, and a processor configured to control the first power portion, the second power portion, and the movement mechanism, the print method comprising:

performing first control of controlling the first power portion and moving the first wiper to the first contact position, and controlling the second power portion and moving the second wiper to the second non-contact position;

after moving the first wiper and the second wiper by the first control, performing second control of controlling the movement mechanism and relatively moving the carriage to cause the first head to pass the first wiper at the first contact position performing third control of controlling the first power portion and moving the first wiper to the first non-contact position, and controlling the second power portion and moving the second wiper to the second contact position; and after moving the first wiper and the second wiper by the third control, performing fourth control of controlling the movement mechanism and relatively moving the carriage to cause the second head to pass the second wiper at the second contact position.

18. A printer comprising:

a carriage including a first head and a second head separated in a first direction and at least partially overlapping in a second direction orthogonal to the first direction;

a first wipe mechanism including a first wiper, and a first power portion being configured to move the first wiper between a first contact position where the first wiper is configured to contact the first head, and a first non-contact position where the first wiper is not configured to contact the first head;

a second wipe mechanism including a second wiper, and a second power portion being configured to move the second wiper between a second contact position where the second wiper is configured to contact the second head, and a second non-contact position where the second wiper is not configured to contact the second head;

a movement mechanism configured to relatively move the carriage in the first direction with respect to the first wiper and the second wiper;

a processor; and a memory storing computer-readable instructions that, when executed by the processor, cause the processor to perform processes comprising:

performing first control of controlling the first power portion and moving the first wiper to the first contact position, and controlling the second power portion and moving the second wiper to the second non-contact position; and after moving the first wiper and the second wiper by the first control, performing second control of controlling the movement mechanism and relatively moving the carriage to cause the first head to pass the first wiper at the first contact position, wherein the first wiper includes a first rubber wiper made from rubber, and a first foam wiper made from a porous material, and the second wiper includes a second rubber wiper made from rubber, and a second foam wiper made from a porous material, further comprising:

a platen; and a cap mechanism provided opposite to the platen with respect to the first wiper and the second wiper in the first direction, and including a cap configured to cover the first head and the second head, wherein when the first wiper is positioned at the first contact position, the first foam wiper is positioned between the first rubber wiper and the cap mechanism in the first direction, and when the second wiper is positioned at the second contact position, the second foam wiper is positioned between the second rubber wiper and the cap mechanism in the first direction.

* * * * *